United States Patent
Yoo et al.

(10) Patent No.: US 10,434,987 B2
(45) Date of Patent: Oct. 8, 2019

(54) VEHICLE ASSISTANCE APPARATUS AND VEHICLE COMPRISING SAME

(71) Applicant: LG ELECTRONICS INC., Seoul (KR)

(72) Inventors: Wonseok Yoo, Seoul (KR); Jongoh Park, Seoul (KR)

(73) Assignee: LG Electronics Inc., Seoul (KR)

(*) Notice: Subject to any disclaimer, the term of this patent is extended or adjusted under 35 U.S.C. 154(b) by 0 days.

(21) Appl. No.: 16/067,332

(22) PCT Filed: Feb. 19, 2016

(86) PCT No.: PCT/KR2016/001661
§ 371 (c)(1),
(2) Date: Jun. 29, 2018

(87) PCT Pub. No.: WO2017/115916
PCT Pub. Date: Jul. 6, 2017

(65) Prior Publication Data
US 2019/0023223 A1   Jan. 24, 2019

(30) Foreign Application Priority Data
Dec. 30, 2015 (KR) .......................... 10-2015-0189606

(51) Int. Cl.
*B60R 25/20* (2013.01)
*B60R 25/043* (2013.01)
(Continued)

(52) U.S. Cl.
CPC ........ *B60R 25/209* (2013.01); *B60R 21/0134* (2013.01); *B60R 25/016* (2013.01);
(Continued)

(58) Field of Classification Search
CPC . B60R 25/209; B60R 25/016; B60R 25/2081; B60R 25/043; B60R 25/245
(Continued)

(56) References Cited

U.S. PATENT DOCUMENTS

2003/0150416 A1* 8/2003 Flick .................. B60R 16/03
123/179.2
2006/0293813 A1* 12/2006 Nou .................. G07C 5/008
701/31.4
(Continued)

FOREIGN PATENT DOCUMENTS

JP           05050074 U    7/1993
KR       20080038596 B2   5/2008
(Continued)

OTHER PUBLICATIONS

Korean Office Action in Korean Application No. 10-2015-0189606, dated Aug. 8, 2017, 10 pages.
(Continued)

*Primary Examiner* — Abby Y Lin
*Assistant Examiner* — Sanjeev Malhotra
(74) *Attorney, Agent, or Firm* — Fish & Richardson P.C.

(57) ABSTRACT

According to an embodiment, there is provided A vehicle assistance apparatus including: a communication unit for receiving a remote start request; a sensor unit for sensing an object around the vehicle; and a processor for detecting a remote start restriction element among the objects around the vehicle, and controlling the remote start request to be restricted and performed according to the detected remote start restriction element.

20 Claims, 25 Drawing Sheets

(51) Int. Cl.
*B60R 25/045* (2013.01)
*B60R 25/10* (2013.01)
*B60R 25/102* (2013.01)
*B60W 50/12* (2012.01)
*B60R 21/0134* (2006.01)
*B60R 25/01* (2013.01)
*B60R 25/24* (2013.01)

(52) U.S. Cl.
CPC .......... *B60R 25/043* (2013.01); *B60R 25/045* (2013.01); *B60R 25/10* (2013.01); *B60R 25/102* (2013.01); *B60R 25/2081* (2013.01); *B60R 25/245* (2013.01); *B60W 50/12* (2013.01); *Y02T 90/14* (2013.01)

(58) Field of Classification Search
USPC ........ 701/2, 20, 31.4, 70; 717/168; 340/901; 123/179.2
See application file for complete search history.

(56) References Cited

U.S. PATENT DOCUMENTS

| | | | | |
|---|---|---|---|---|
| 2007/0016342 A1* | 1/2007 | Allen | .................... | H04L 67/125 701/2 |
| 2008/0117079 A1* | 5/2008 | Hassan | ................. | B60R 25/045 340/901 |
| 2013/0151036 A1* | 6/2013 | Harumoto | ........... | F02N 11/0807 701/2 |
| 2013/0151038 A1* | 6/2013 | Harumoto | ............... | G06F 17/00 701/2 |
| 2014/0324310 A1* | 10/2014 | Kobayashi | ......... | B62D 15/0285 701/70 |
| 2015/0166075 A1* | 6/2015 | Nam | ................. | H04W 52/0238 701/2 |
| 2016/0077827 A1* | 3/2016 | Throop | ................... | B60L 58/13 717/168 |
| 2016/0090112 A1* | 3/2016 | Smith | ................. | B61L 15/0018 701/20 |

FOREIGN PATENT DOCUMENTS

| | | |
|---|---|---|
| KR | 20090044651 B2 | 5/2009 |
| KR | 20130008272 B2 | 1/2013 |
| KR | 20130128765 B2 | 11/2013 |

OTHER PUBLICATIONS

Korean Notice of Allowance in Korean Application No. 10-2015-0189606, dated Feb. 21, 2018, 4 pages.

* cited by examiner

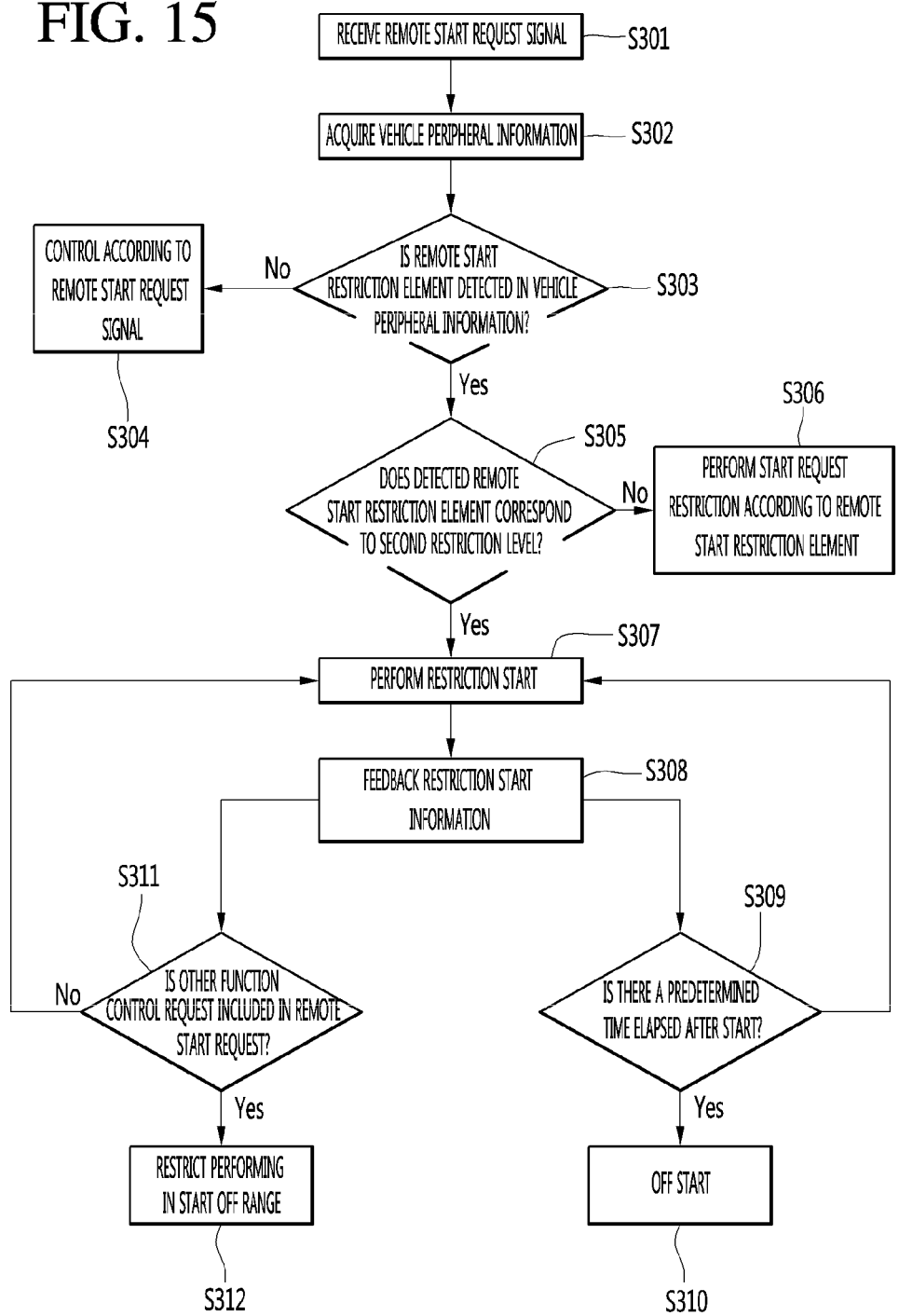

VEHICLE ASSISTANCE APPARATUS AND VEHICLE COMPRISING SAME

CROSS-REFERENCE TO RELATED APPLICATIONS

This application is a National Stage application under 35 U.S.C. § 371 of International Application No. PCT/KR2016/001661, filed Feb. 19, 2016, which claims the benefit of Korean Application No. 10-2015-0189606, filed on Dec. 30, 2015. The disclosures of the prior applications are incorporated by reference in their entirety.

TECHNICAL FIELD

The present invention relates to a vehicle assistance apparatus provided in a vehicle and a vehicle including the same.

BACKGROUND ART

A vehicle is an apparatus that transports a user ridding therein in a desired direction. A representative example of a vehicle may be an automobile.

A vehicle includes an internal combustion engine vehicle, an external combustion engine vehicle, a gas turbine vehicle, an electric vehicle, etc. according to type of motor used.

The electric vehicle refers to a vehicle for driving an electric motor using electric energy and includes a pure electric vehicle, a hybrid electric vehicle (HEV), a plug-in hybrid electric vehicle (PHEV), a fuel cell electric vehicle (FCEV), etc.

Recently, intelligent vehicles have been actively developed for safety or convenience of a driver or pedestrian.

The intelligent vehicle is an advanced vehicle using information technology (IT) and is also referred to as a smart vehicle. The intelligent vehicle provides optimal traffic efficiency by introduction of an advanced vehicle system and through association with an intelligent traffic system (ITS).

In particular, intelligent automobiles have the technical advantage of maximizing the safety of pedestrians as well as the driver, passengers by developing safety-related core technologies such as obstacle detection and collision detection or mitigation devices.

On the other hand, techniques for remote control functions, and the like for starting the vehicle through a terminal such as a smart key and for controlling functions in the vehicle from the outside the vehicle are being developed.

However, such a remote control function may cause problems such as damage to the peripheral due to uncontrollably controlling the vehicle with a signal requested by the user in a situation where the user cannot see the vehicle.

DISCLOSURE

Technical Problem

In order to solve the above-described problems, an embodiment of the present invention is to provide a vehicle assistance apparatus and a vehicle including the same, which are capable of performing a remote start request for each situation.

Technical Solution

According to an embodiment, there is provided A vehicle assistance apparatus including: a communication unit for receiving a remote start request; a sensor unit for sensing an object around the vehicle; and a processor for detecting a remote start restriction element among the objects around the vehicle, and controlling the remote start request to be restricted and performed according to the detected remote start restriction element.

The embodiment provides a vehicle including the vehicle assistance apparatus described above.

Advantageous Effect

The vehicle assistance apparatus according to the embodiment can level the restriction element for each restricting level so as to restrict and perform the start functions to the restrict level of the detected restriction element. The driver's convenience can be improved by this remote start restriction function by allowing the user to comply with the regulations and performs the desired control functions within a restricted range without damaging the peripheral of the vehicle to maintain a comfortable environment in the vehicle.

DESCRIPTION OF DRAWINGS

FIG. 15 is a flowchart for explaining a process of performing a remote start restriction function according to a second restriction level detection according to an embodiment of the present invention.

BEST MODE

Figure 1:
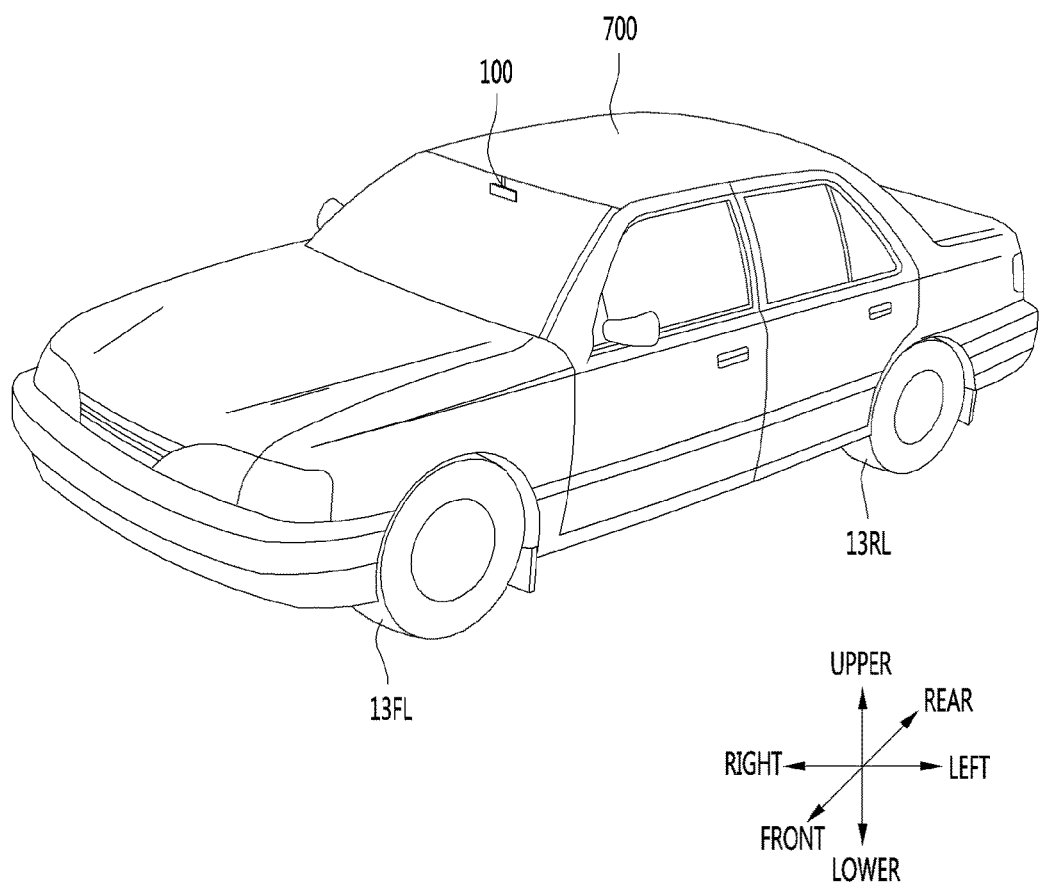
FIG. 1 is a diagram showing the appearance of a vehicle having a vehicle assistance apparatus according to an embodiment of the present invention.

Hereinafter, the embodiments disclosed in the present specification will be described in detail with reference to the accompanying drawings, and the same or similar elements are denoted by the same reference numerals even though they are depicted in different drawings and redundant descriptions thereof will be omitted. In the following description, with respect to constituent elements used in the following description, suffixes "module" and "unit" are used only in consideration of ease in preparation of the specification, and do not have distinct meanings. Accordingly, the suffixes "module" and "unit" may be used interchangeably. In addition, in the following description of the embodiments disclosed in the present specification, a detailed description of known functions and configurations incorporated herein will be omitted when it may make the subject matter of the embodiments disclosed in the present specification rather unclear. In addition, the accompanying drawings are provided only for a better understanding of the embodiments disclosed in the present specification and are not intended to restrict technical ideas disclosed in the present specification. Therefore, it should be understood that the accompanying drawings include all modifications, equivalents and substitutions within the scope and spirit of the present invention.

It will be understood that although the terms first, second, etc., may be used herein to describe various components, these components should not be restricted by these terms. These terms are only used to distinguish one component from another component.

It will be understood that when a component is referred to as being "connected to" or "coupled to" another component, it may be directly connected to or coupled to another component or intervening components may be present. In contrast, when a component is referred to as being "directly connected to" or "directly coupled to" another component, there are no intervening components present.

As used herein, the singular form is intended to include the plural forms as well, unless context clearly indicates otherwise.

In the present application, it will be further understood that the terms "comprises", includes," etc. specify the presence of stated features, integers, steps, operations, elements, components, or combinations thereof, but do not preclude the presence or addition of one or more other features, integers, steps, operations, elements, components, or combinations thereof.

A vehicle as described in this specification may include a car and a motorcycle. Hereinafter, a car will be focused upon.

A vehicle as described in this specification may include all of an internal combustion engine vehicle including an engine as a power source, a hybrid vehicle including both an engine and an electric motor as a power source, and an electric vehicle including an electric motor as a power source.

In the following description, the left of a vehicle means the left of the vehicle in the direction of travel and the right of the vehicle means the right of the vehicle in the direction of travel.

In the following description, a left hand drive (LHD) vehicle will be focused upon unless otherwise stated.

The mobile terminal described in this specification may include a mobile phone, a smartphone, a laptop computer, a digital broadcasting terminal, a personal digital assistant (PDA), a portable multimedia player (PMP), a navigation device, a slate PC, Tablet PCs, ultrabooks, wearable devices (for example, smartwatch, smart glasses, and head-mounted display (HMD)).

In the following description, the vehicle assistance apparatus is provided in a vehicle to exchange information necessary for data communication with the vehicle and to perform a vehicle driving assistance function. A set of some units of the vehicle may be defined as a vehicle assistance apparatus.

When the vehicle assistance apparatus is separately provided, at least some units (see FIG. 2) of the vehicle assistance apparatus are not included in the vehicle assistance apparatus but may be units of the vehicle or units of another apparatus mounted in the vehicle. Such external units transmit and receive data through an interface of the vehicle assistance apparatus and thus may be understood as being included in the vehicle assistance apparatus.

Hereinafter, for convenience of description, assume that the vehicle assistance apparatus according to the embodiment directly includes the units shown in FIG. 2.

Hereinafter, the vehicle assistance apparatus according to the embodiment will be described in detail with reference to the drawings.

Referring to FIG. 1, the vehicle 700 according to the embodiment may include wheels 13FL and 13RL rotated by a power source and a vehicle assistance apparatus 100.

The vehicle assistance apparatus 100 according to the embodiment detects a peripheral condition of the vehicle upon receipt of a remote start request signal of the user, and when an element for restricting start is detected from the information about the peripheral condition of the vehicle, performs the remote start restriction function which restricts and performs the remote start request according to the characteristics of the detected restriction element.

In particular, the vehicle assistance apparatus 100 according to the embodiment can level the restriction elements for each restriction levels, thereby restricting and performing the start functions to the restriction levels of the detected restriction elements. The driver's convenience can be improved by this remote start restriction function by allowing the user to comply with the regulations and performs the desired control functions within a restricted range without damaging the peripheral of the vehicle to maintain a comfortable environment in the vehicle.

Figure 2:
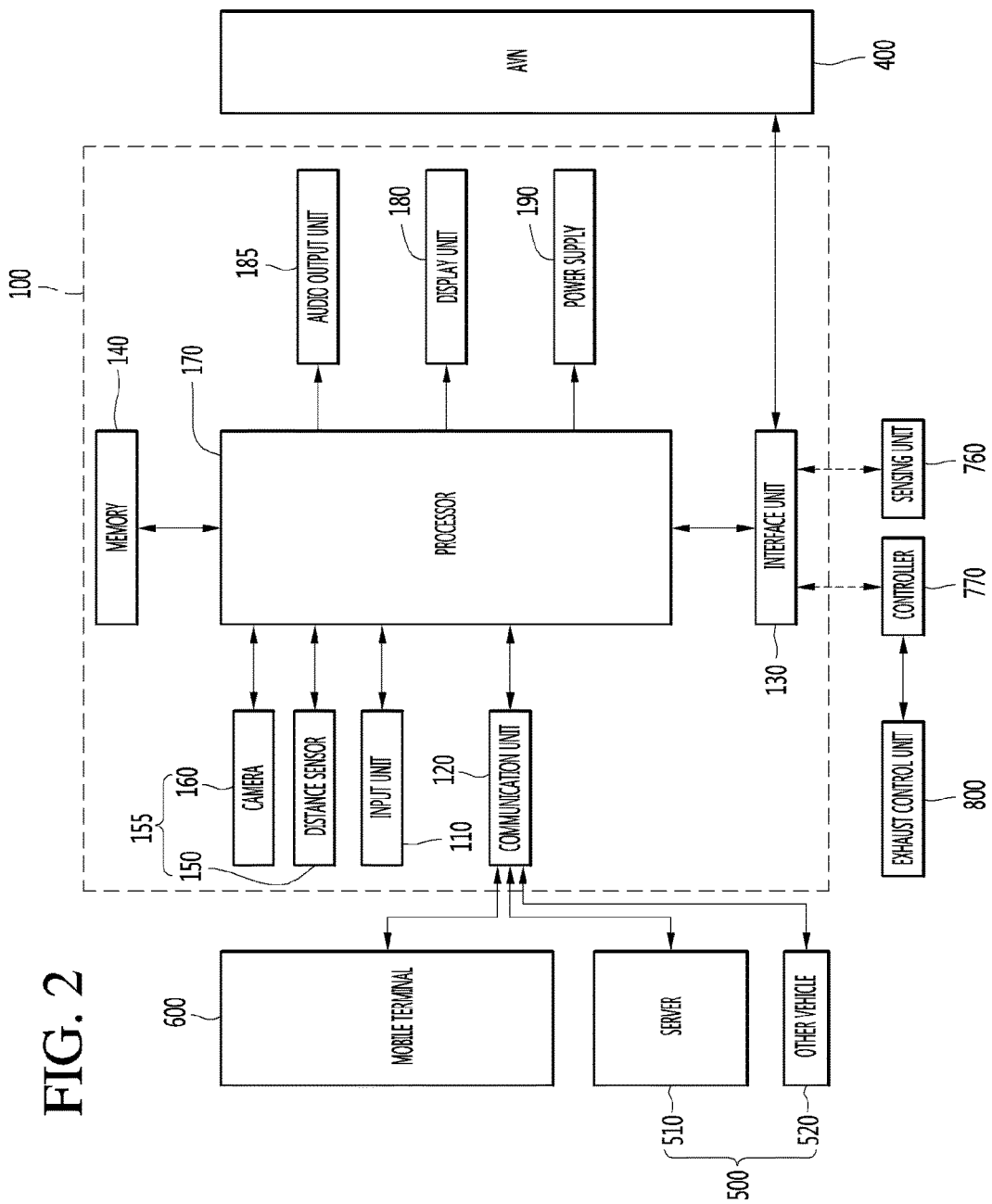
FIG. 2 is a block diagram of a vehicle assistance apparatus according to an embodiment of the present invention.

Referring to FIG. 2, such a vehicle assistance apparatus 100 may include an input unit 110, a communication unit 120, an interface 130, a memory 140, a sensor unit 155, a processor 170, a display unit 180, an audio output unit 185 and a power supply 190. The units of the vehicle assistance apparatus 100 shown in FIG. 2 are not essential to implementation of the vehicle assistance apparatus 100 and thus the vehicle assistance apparatus 100 described in the present specification may have components greater or less in number than the number of the above-described components.

Each component will now be described in detail. The vehicle assistance apparatus 100 may include the input unit 110 for receiving user input.

For example, the user inputs a setting for the remote start restriction function of the vehicle assistance apparatus 100 through the input unit 110, or a performing input for turning on/off the power of the vehicle assistance apparatus 100, and the like can be performed.

The input unit 110 may include at least one of a gesture input unit (e.g., an optical sensor, etc.) for sensing a user gesture, a touch input unit (e.g., a touch sensor, a touch key, a push key (mechanical key), etc.) for sensing touch and a microphone for sensing voice input and receive user input.

Next, the vehicle assistance apparatus 100 may include the communication unit 120 for communicating with another vehicle 520, a terminal 600 and a server 510.

The vehicle assistance apparatus 100 can exchange data on the remote start function and the remote start restriction function with the mobile terminal through the communication unit 120.

In detail, the communication unit 120 can receive a remote start request signal from the user's mobile terminal 600.

This remote start request signal may include a request to perform various functions in the vehicle, as well as a start ON request. For example, the remote start request signal may further include request information for controlling a function of at least one of a temperature control inside the vehicle, an air conditioning control, an air purification, and a defrosting function.

In addition, the communication unit 120 may transmit feedback information to the user's mobile terminal when the remote start restriction function is performed. In detail, the vehicle assistance apparatus 100 can transmit information indicating that the restriction is performed to the mobile terminal through the communication unit 120 when the restriction element that restricts the remote start is detected.

If the vehicle assistance apparatus 100 detects the remote start restriction element in advance before parking, information on the remote start restriction is transmitted to the mobile terminal through the communication unit 120 in advance and it is possible to notify the user before remote start input that remote start is impossible or function performing is restricted.

In addition, the vehicle assistance apparatus 100 can receive communication information including at least one of navigation information, other vehicle driving information, and traffic information through the communication unit 120.

In particular, the communication information may include information on the remote start restriction element. For example, the communication information may include information about whether a position at which the vehicle is stopped is in an idling restriction zone and a restricted time. In addition, the communication information may include information that the vehicle is positioned in an enclosed space, such as an indoor space or a parking tower as the position where the vehicle was stopped.

In addition, the communication unit 120 may receive at least one of position information, weather information and road traffic condition information (e.g., transport protocol experts group (TPEG), etc.) from the mobile terminal 600 and/or the server 510.

The communication unit 120 may receive traffic information from the server 510 having an intelligent traffic system (ITS).

Here, the traffic information may include traffic signal information, lane information, vehicle surrounding information or position information.

In addition, the communication unit 120 may receive navigation information from the server 510 and/or the mobile terminal 600. Here, the navigation information may include at least one of map information related to vehicle driving, lane information, vehicle position information, set destination information and route information according to the destination.

In addition, the communication unit 120 may receive the real-time position of the vehicle 700 as the navigation information. In detail, the communication unit 120 may include a global positioning system (GPS) module and/or a Wi-Fi (Wireless Fidelity) module and acquire the position of the vehicle.

In addition, the communication unit 120 may receive driving information of the other vehicle 520 from the other vehicle 520 and transmit information on the vehicle 700, thereby sharing driving information between vehicles. Here, the shared driving information may include vehicle traveling direction information, position information, vehicle speed information, acceleration information, moving route information, forward/reverse information, adjacent vehicle information and turn signal information.

In addition, when a user rides in the vehicle 700, the mobile terminal 600 of the user and the vehicle assistance apparatus 100 may pair with each other automatically or by performing a user application.

The communication unit 120 may exchange data with the other vehicle 520, the mobile terminal 600 or the server 510 in a wireless manner.

In detail, the communication module 120 can perform wireless communication using a wireless data communication method. As the wireless data communication method, technical standards or communication methods for mobile communications (for example, Global System for Mobile Communication (GSM), Code Division Multiple Access (CDMA), CDMA2000 (Code Division Multiple Access 2000), EV-DO (Evolution-Data Optimized), Wideband CDMA (WCDMA), High Speed Downlink Packet Access (HSDPA), HSUPA (High Speed Uplink Packet Access), Long Term Evolution (LTE), LTE-A (Long Term Evolution-Advanced), and the like) may be used.

The communication unit module 120 is configured to facilitate wireless Internet technology. Examples of such wireless Internet technology include Wireless LAN (WLAN), Wireless Fidelity (Wi-Fi), Wi-Fi Direct, Digital Living Network Alliance (DLNA), Wireless Broadband (WiBro), Worldwide Interoperability for Microwave Access (WiMAX), High Speed Downlink Packet Access (HSDPA), HSUPA (High Speed Uplink Packet Access), Long Term Evolution (LTE), LTE-A (Long Term Evolution-Advanced), and the like.

In addition, the communication unit 120 is configured to facilitate short-range communication. For example, short-range communication may be supported using at least one of Bluetooth™, Radio Frequency IDentification (RFID), Infrared Data Association (IrDA), Ultra-Wideband (UWB), Zig-Bee, Near Field Communication (NFC), Wireless-Fidelity (Wi-Fi), Wi-Fi Direct, Wireless USB (Wireless Universal Serial Bus), and the like.

In addition, the vehicle assistance apparatus 100 may pair with the mobile terminal positioned inside the vehicle using a short-range communication method and wirelessly exchange data with the other vehicle 520 or the server 510 using a long-distance wireless communication module of the mobile terminal.

Next, the vehicle assistance apparatus 100 may include the interface 130 for receiving data of the vehicle and transmitting a signal processed or generated by the processor 170.

Figure 26:
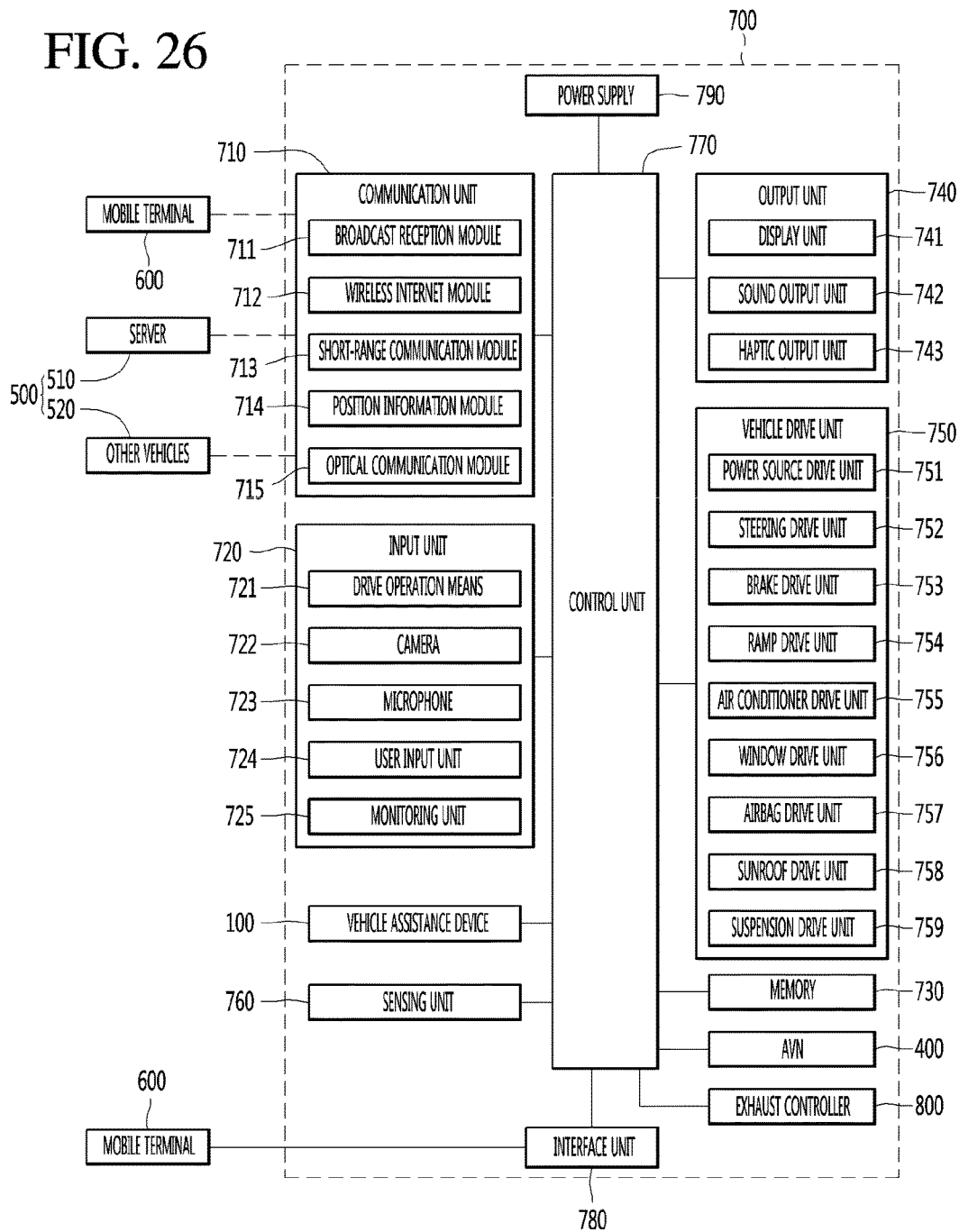
FIG. 26 is a block diagram showing the internal configuration of the vehicle having the vehicle assistance apparatus shown in FIG. 1.

The vehicle assistance apparatus 100 can transmit a control signal according to the performing of the remote start restriction function through the interface unit 130 to the controller 770 of the vehicle or directly to a module which performs a function (for example, a unit of the vehicle shown in FIG. 26). More specifically, the interface unit 130 can transmit a remote start signal and control the power source driving unit to start. In addition, the interface unit 130 transmits a signal for performing a remote control function such as a vehicle temperature control function, a defrosting function, and an air purifying function to the driving units of the vehicle directly or through the controller to control and perform the function.

In detail, the vehicle assistance apparatus 100 can receive at least one of the navigation information and the sensor information through the interface unit 130.

Such navigation information and sensor information may be used to detect the remote start restriction element. More specifically, the information may include information about the remote start restriction element. For example, information about whether the position where the vehicle is stopped is in the idling restriction zone and the restricted time may be included. In addition, the communication information may include information that the vehicle is positioned in an enclosed space, such as an indoor space or a parking tower as the position where the vehicle was stopped.

In addition, the vehicle assistance apparatus 100 can transmit a control signal for performing the remote start restriction function, information generated in the vehicle assistance apparatus 100, or the like through the interface unit 130.

To this end, the interface 130 may perform data communication with at least one of the controller 770 of the vehicle, an audio-video-navigation (AVN) apparatus 400 and the sensing unit 760 using a wired or wireless communication method.

In detail, the interface 130 may receive navigation information by data communication with the controller 770, the AVN apparatus 400 and/or a separate navigation apparatus.

In addition, the interface 130 may receive sensor information from the controller 770 or the sensing unit 760.

Here, the sensor information may include at least one of vehicle traveling direction information, vehicle position information, vehicle speed information, acceleration information, vehicle tilt information, forward/reverse information, fuel information, information on a distance from a preceding/rear vehicle, information on a distance between a vehicle and a lane and turn signal information, etc.

The sensor information may be acquired from a heading sensor, a yaw sensor, a gyro sensor, a position module, a vehicle forward/reverse sensor, a wheel sensor, a vehicle speed sensor, a vehicle tilt sensor, a battery sensor, a fuel sensor, a tire sensor, a steering sensor based on rotation of the steering wheel, a vehicle interior temperature sensor, a vehicle interior humidity sensor, a door sensor, etc. The position module may include a GPS module for receiving GPS information.

The interface 130 may receive user input through the user input unit 110 of the vehicle. The interface 130 may receive user input from the input unit of the vehicle or through the controller 770. That is, when the input unit is provided in the vehicle, user input may be received through the interface 130.

In addition, the interface 130 may receive traffic information acquired from the server. The server 500 may be positioned at a traffic control surveillance center for controlling traffic. For example, when traffic information is received from the server 500 through the communication unit 120 of the vehicle 700, the interface 130 may receive traffic information from the controller 770.

Next, the memory 140 may store a variety of data for overall operation of the vehicle assistance apparatus 100, such as a program for processing or control of the controller 170.

In addition, the memory 140 may store data and commands for operation of the vehicle assistance apparatus 100 and a plurality of application programs or applications performed in the vehicle assistance apparatus 100. At least some of such application programs may be downloaded from an external server through wireless communication. At least one of such application programs may be installed in the vehicle assistance apparatus 100 upon release, in order to provide the basic function (for example, remote start restriction function) of the vehicle assistance apparatus 100. Such application programs may be stored in the memory 140 and may be performed to perform operation (or function) of the vehicle assistance apparatus 100 by the processor 170.

In addition, the memory 140 may store information about the remote start restriction element.

In detail, the memory 140 can level and store the remote start restriction elements according to their nature, characteristics, and restriction, and store so that the remote start restriction function is performed to be different for each different level. In other words, the vehicle assistance apparatus 100 can set a restrict level for the remote start restriction elements, store the restrict level in the memory 140, determine the level for the remote start restriction element detected when the remote start restriction element is detected, and restrict and perform the remote start request according to the determined level to be different from each other.

For example, the memory 140 may store a first restriction level at which the vehicle is positioned within the remote start unavailable area by regulation, a second restriction level at which the exhaust gas emission of the vehicle is harmful, and a third restriction level at which a person other than the driver is positioned within a predetermined distance of the vehicle and match and then store the remote start restriction function to be different according to the respective restriction levels.

The memory 140 may store data for checking an object included in an image. For example, the memory 140 may store data for checking a predetermined object using a predetermined algorithm when the predetermined object is detected from an image of the vicinity of the vehicle acquired through the camera 160.

For example, the memory 140 may store data for checking the object using the predetermined algorithm when the predetermined algorithm such as a lane, a traffic sign, a two-wheeled vehicle and a pedestrian is included in an image acquired through the camera 160.

The memory 140 may be implemented in a hardware manner using at least one selected from among a flash memory, a hard disk, a solid state drive (SSD), a silicon disk drive (SDD), a micro multimedia card, a card type memory (e.g., an SD or XD memory, etc.), a random access memory (RAM), a static random access memory (SRAM), a read-only memory (ROM), an electrically erasable programmable read-only memory (EEPROM), a programmable read-only memory (PROM), a magnetic memory, a magnetic disk and an optical disc.

In addition, the vehicle assistance apparatus 100 may operate in association with a network storage for performing a storage function of the memory 140 over the Internet.

Next, the vehicle assistance apparatus 100 may further include a sensor unit 155 for detecting a situation around the vehicle. More specifically, the sensor unit 155 can sense the object around the vehicle, detect the characteristic of the object, and sense the peripheral of the vehicle from the object information.

The sensor unit 155 may include at least one of a distance sensor 150 for sensing the position of an object positioned in the vicinity of the vehicle and a camera 160 for capturing the image of the vicinity of the vehicle.

First, the distance sensor 150 may accurately sense the position of the object positioned in the vicinity of the vehicle, a distance between the object and the vehicle, a movement direction of the object, etc. The distance sensor 150 may continuously measure the position of the sensed object to accurately sense change in positional relationship with the vehicle.

The distance sensor 150 may sense the object positioned in at least one of the front, rear, left and right areas of the vehicle. The distance sensor 150 may be provided at various positions of the vehicle.

Figure 3:
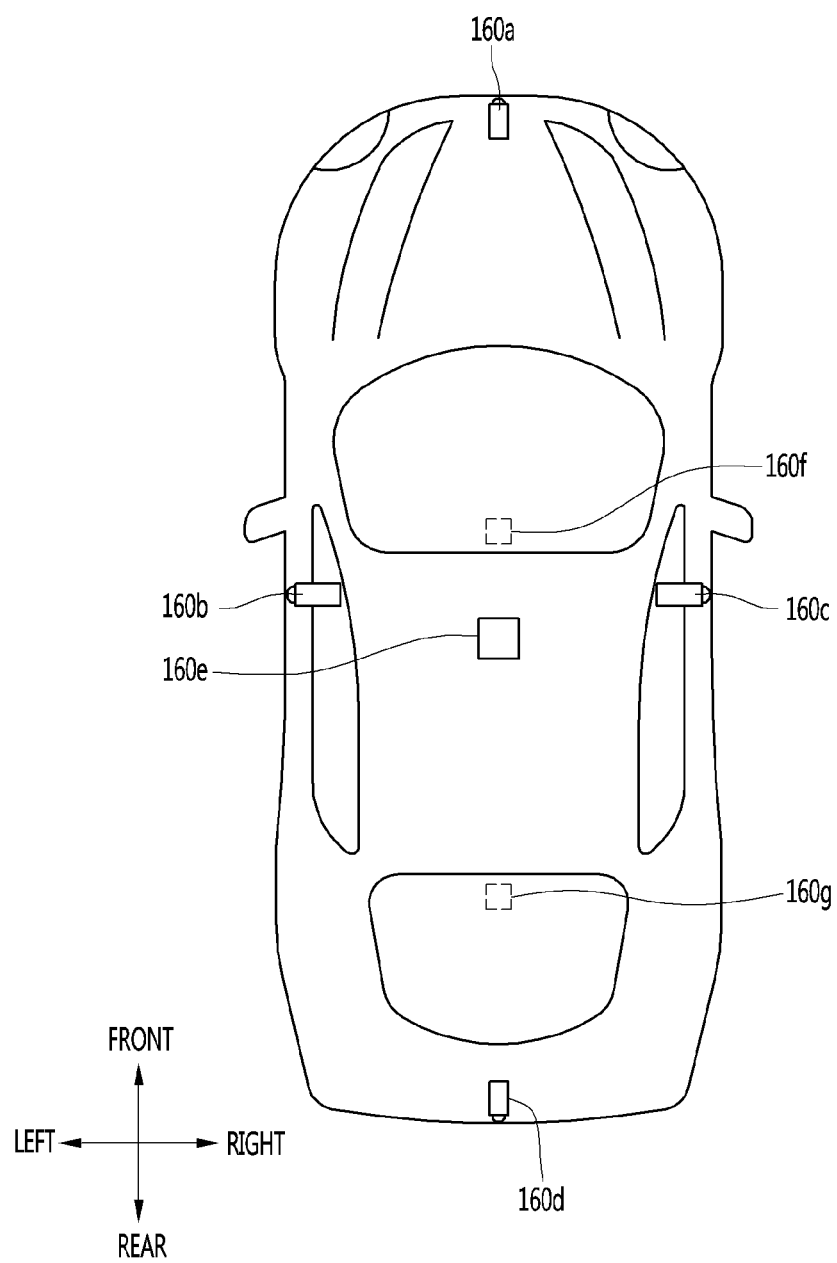
FIG. 3 is a plan view of a vehicle having a vehicle assistance apparatus according to an embodiment of the present invention.

In detail, referring to FIG. 3, the distance sensor 150 may be provided at at least one of the front, rear, left and right sides and ceiling of the vehicle.

The distance sensor 150 may include at least one of various distance measurement sensors such as a Lidar sensor, a laser sensor, an ultrasonic wave sensor and a stereo camera.

For example, the distance sensor 150 is a laser sensor and may accurately measure a positional relationship between the vehicle and the object using a time-of-flight (TOF) and/or a phase-shift method according to a laser signal modulation method. More specifically, the time delay method can measure the separation distance from the object and the separation direction by emitting a pulsed laser signal and measuring the time that the reflected pulse signals from the objects within the measurement range arrive at the receiver.

In addition, the object information for determining whether the object is a remote start restriction element may be acquired by analyzing the image captured by the camera 160 by the processor 170.

More specifically, the vehicle assistance apparatus 100 may include a camera 160 for acquiring the vehicle peripheral image. Then, the acquired vehicle peripheral image can detect the object around the vehicle by the processor 170, and detect the properties of the object to generate the image information.

Here, the image information may be included in the vehicle peripheral information as information relating to at least one of the type of the object, the traffic signal information displayed by the object, the distance between the object and the vehicle, and the position of the object.

In detail, the processor 170 may detect the object from the captured image through image processing, track the object, measure the distance from the object, and check the object to analyze the object, thereby generating image information.

The camera 160 may be provided at various positions.

In detail, with reference to FIG. 3, the camera 160 includes a first internal camera 160*f* for imaging the front of a vehicle 700 in the vehicle and acquiring a front image and a second internal camera 160*g* for acquiring a rear image.

In addition, the plurality of cameras 160 may be further disposed at at least one of the left, rear, right, front, and ceiling of the vehicle 700, respectively.

In detail, the left camera 160*b* may be provided inside a case surrounding a left side mirror. Alternatively, the left camera 160*b* may be provided outside the case surrounding the left side mirror. Alternatively, the left camera 160*b* may be provided in one of a left front door, a left rear door or an outer area of a left fender.

The right camera 160*c* may be provided inside a case surrounding a right side mirror. Alternatively, the right camera 160*c* may be provided outside the case surrounding the right side mirror. Alternatively, the right camera 160*c* may be provided in one of a right front door, a right rear door or an outer area of a right fender.

In addition, the rear camera 160*d* may be provided in the vicinity of a rear license plate or a trunk switch. The front camera 160*a* may be provided in the vicinity of an emblem or a radiator grill.

The processor 170 may synthesize images captured in all directions and provide an around view image viewed from the top of the vehicle. Upon generating the around view image, boundary portions between the image regions occur. Such boundary portions may be subjected to image blending for natural display.

In addition, the ceiling camera 160*e* may be provided on the ceiling of the vehicle to capture the image of the vehicle in all directions.

The camera 160 may directly include an image sensor and an image processing module. The camera 160 may process a still image or a moving image acquired by the image sensor (e.g., CMOS or CCD). In addition, the image processing module processes the still image or the moving image acquired through the image sensor, extracts necessary image information, and delivers the extracted image information to the processor 170.

In order to enable the processor 170 to more easily perform object analysis, in the embodiment, the camera 160 may be a stereo camera for capturing an image and, at the same time, measuring a distance from an object.

The sensor unit 155 may be a stereo camera including the distance sensor 150 and the camera 160. That is, the stereo camera may acquire an image and, at the same time, sense a positional relationship with the object.

Hereinafter, referring to FIGS. 4 to 6, the stereo camera and a method of detecting image information by the processor 170 using the stereo camera will be described in greater detail.

Figure 4:
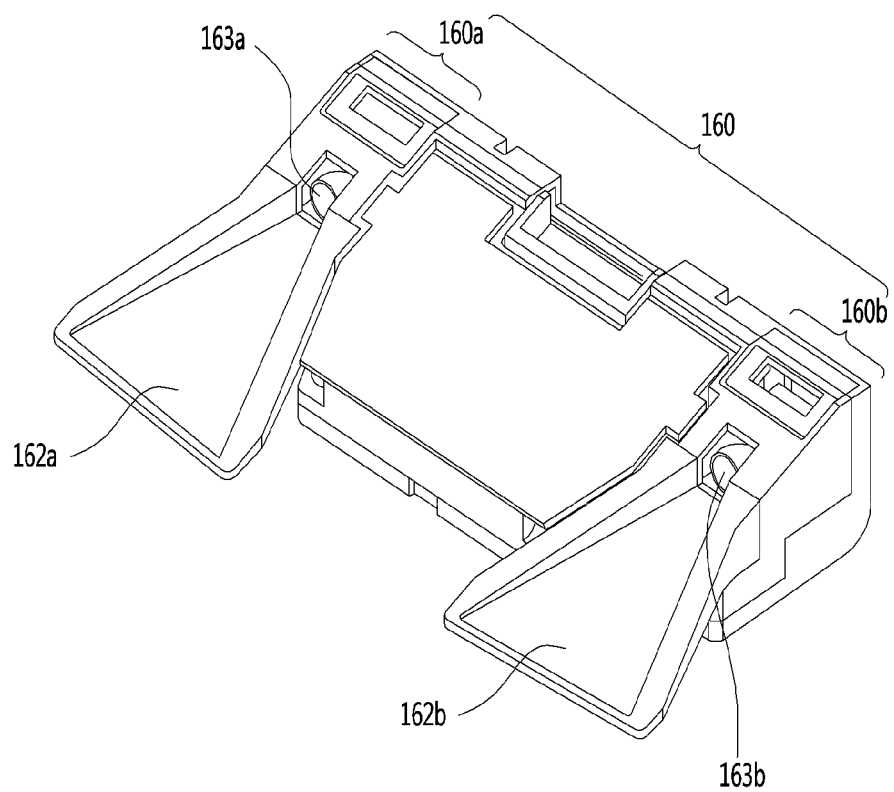
FIG. 4 is a diagram showing an example of a camera according to an embodiment of the present invention.

First, referring to FIG. 4, the stereo camera 160 may include a first camera 160a including a first lens 163a and a second camera 160b including a second lens 163b.

The vehicle assistance apparatus 100 may further include first and second light shield units 162a and 162b for shielding light incident upon the first and second lenses 163a and 163b.

The vehicle assistance apparatus 100 may acquire stereo images of the vicinity of the vehicle from the first and second cameras 160a and 160b, detect disparity based on the stereo images, detect an object from at least one stereo image, and continuously track movement of the object after object detection.

Figure 5:
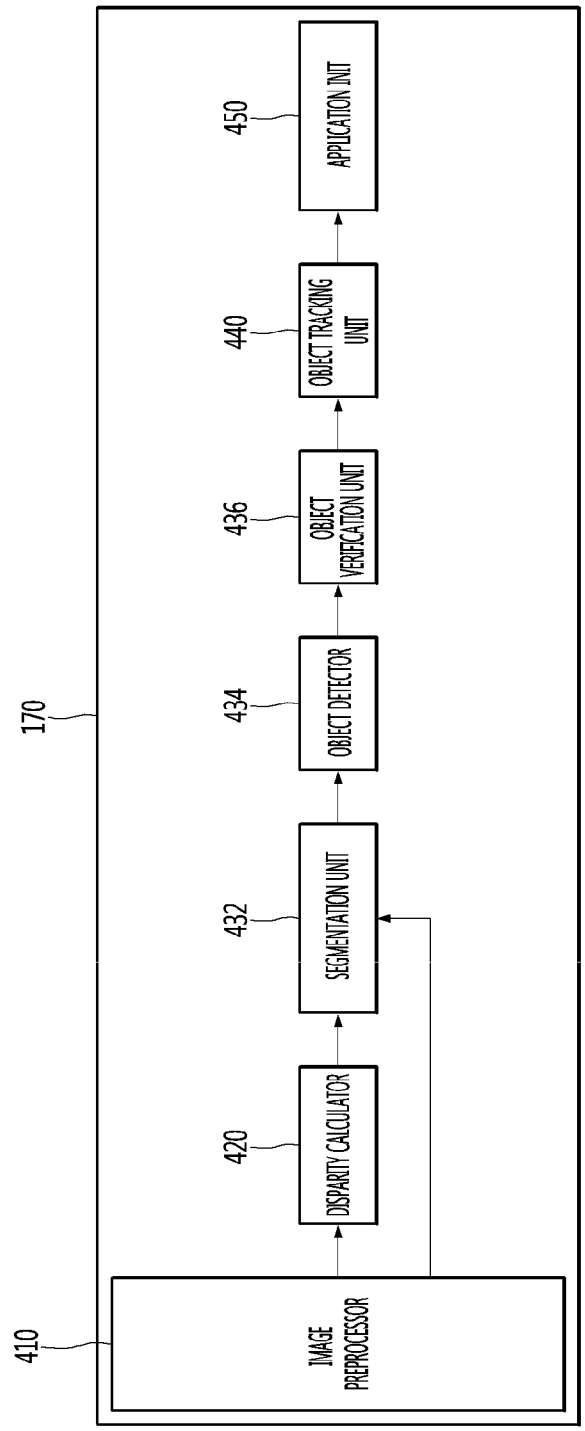
FIGS. 5 and 6 are diagrams illustrating an example of a method of generating image information from an image of a camera according to an embodiment of the present invention.

Referring to FIG. 5, as one example of the block diagram of the internal configuration of the processor 170, the processor 170 of the vehicle assistance apparatus 100 may include an image preprocessor 410, a disparity calculator 420, an object detector 434, an object tracking unit 440 and an application unit 450. Although an image is processed in order of the image preprocessor 410, the disparity calculator 420, the object detector 434, the object tracking unit 440 and the application unit 450 in FIG. 5 and the following description, the present invention is not restricted thereto.

The image preprocessor 410 may receive an image from the camera 160 and perform preprocessing.

In detail, the image preprocessor 410 may perform noise reduction, rectification, calibration, color enhancement, color space conversion (CSC), interpolation, camera gain control, etc. of the image. An image having definition higher than that of the stereo image captured by the camera 160 may be acquired.

The disparity calculator 420 may receive the images processed by the image preprocessor 410, perform stereo matching of the received images, and acquire a disparity map according to stereo matching. That is, disparity information of the stereo image of the front side of the vehicle may be acquired.

At this time, stereo matching may be performed in units of pixels of the stereo images or predetermined block units. The disparity map may refer to a map indicating the numerical value of binocular parallax information of the stereo images, that is, the left and right images.

The segmentation unit 432 may perform segmentation and clustering with respect to at least one image based on the disparity information from the disparity calculator 420.

In detail, the segmentation unit 432 may segment at least one stereo image into a background and a foreground based on the disparity information.

For example, an area in which the disparity information is less than or equal to a predetermined value within the disparity map may be calculated as the background and excluded. Therefore, the foreground may be segmented. As another example, an area in which the disparity information is greater than or equal to a predetermined value within the disparity map may be calculated as the foreground and extracted. Therefore, the foreground may be segmented.

The background and the foreground may be segmented based on the disparity information extracted based on the stereo images to reduce signal processing speed, the amount of processed signals, etc. upon object detection.

Next, the object detector 434 may detect the object based on the image segment from the segmentation unit 432.

That is, the object detector 434 may detect the object from at least one image based on the disparity information.

In detail, the object detector 434 may detect the object from at least one image. For example, the object may be detected from the foreground segmented by image segmentation.

Next, the object verification unit 436 may classify and verify the segmented object.

To this end, the object verification unit 436 may use an identification method using a neural network, a support vector machine (SVM) method, an identification method by AdaBoost using Haar-like features or a histograms of oriented gradients (HOG) method.

The object verification unit 436 may compare the objects stored in the memory 140 and the detected object and verify the object.

For example, the object verification unit 436 may verify a peripheral vehicle, a lane, a road surface, a traffic sign, a danger zone, a tunnel, etc. positioned in the vicinity of the vehicle.

The object tracking unit 440 may track the verified object. For example, the objects in the sequentially acquired stereo images may be verified, motion or motion vectors of the verified objects may be calculated and motion of the objects may be tracked based on the calculated motion or motion vectors. A peripheral vehicle, a lane, a road surface, a traffic sign, a danger zone, a tunnel, etc. positioned in the vicinity of the vehicle may be tracked.

Next, the application unit 450 may calculate a degree of risk, etc. based on various objects positioned in the vicinity of the vehicle, for example, another vehicle, a lane, a road surface, a traffic sign, etc. In addition, possibility of collision with a preceding vehicle, whether a vehicle slips, etc. may be calculated.

The application unit 450 may output a message indicating such information to the user as driver assistance information based on the calculated degree of risk, possibility of collision or slip. Alternatively, a control signal for vehicle attitude control or driving control may be generated as vehicle control information.

The image preprocessor 410, the disparity calculator 420, the segmentation unit 432, the object detector 434, the object verification unit 436, the object tracking unit 440 and the application unit 450 may be included in the image processor (see FIG. 4) of the processor 170.

In some embodiments, the processor 170 may include only some of the image preprocessor 410, the disparity calculator 420, the segmentation unit 432, the object detector 434, the object verification unit 436, the object tracking unit 440 and the application unit 450. If the camera 160 includes a mono camera 160 or an around view camera 160, the disparity calculator 420 may be excluded. In some embodiments, the segmentation unit 432 may be excluded.

Figure 6:
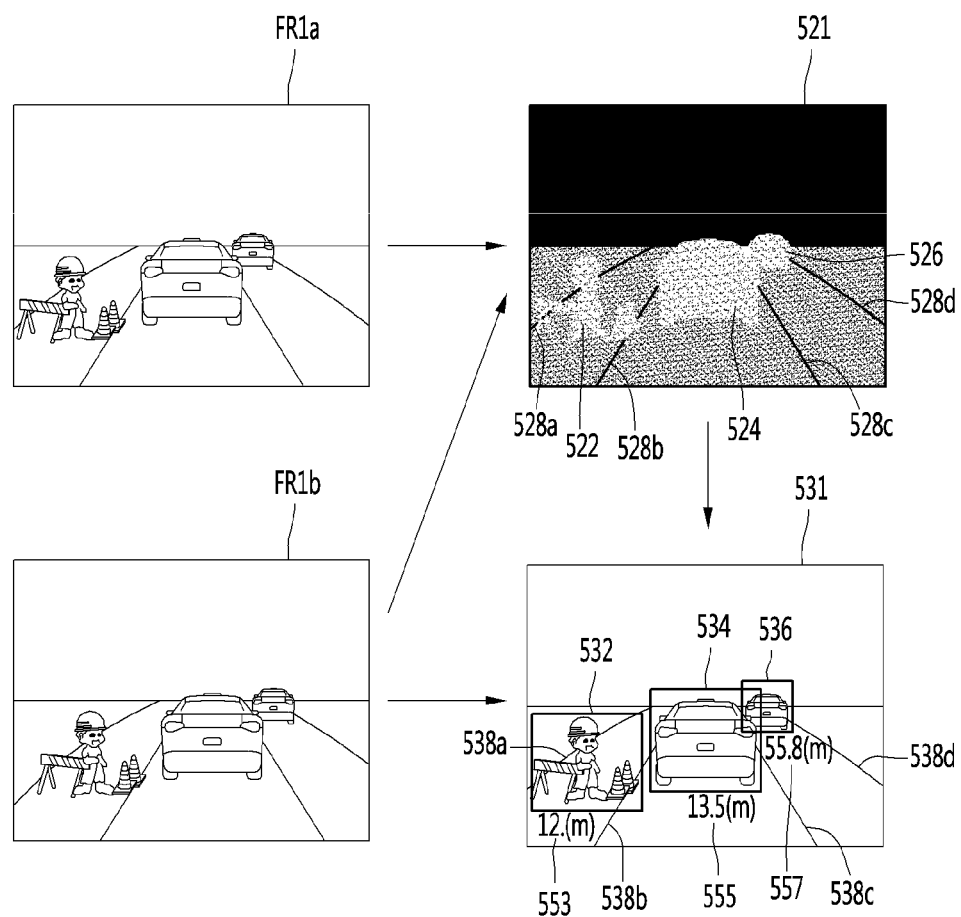

Referring to FIG. 6, during a first frame period, the camera 160 may acquire stereo images.

The disparity calculator 420 of the processor 160 receives stereo images FR1a and FR1b processed by the image preprocessor 410, performs stereo matching with respect to the stereo images FR1a and FR1b and acquires a disparity map 520.

The disparity map 520 indicates the levels of binocular parallax between the stereo images FRIa and FRIb. As a disparity level increases, a distance from a vehicle may decrease and, as the disparity level decreases, the distance from the vehicle may increase.

When such a disparity map is displayed, luminance may increase as the disparity level increases and decrease as the disparity level decreases.

In the figure, disparity levels respectively corresponding to first to fourth lanes 528a, 528b, 528c and 528d and disparity levels respectively corresponding to a construction area 522, a first preceding vehicle 524 and a second preceding vehicle 526 are included in the disparity map 520.

The segmentation unit 432, the object detector 434 and the object verification unit 436 may perform segmentation, object detection and object verification with respect to at least one of the stereo images FRIa and FRIb based on the disparity map 520.

In the figure, object detection and verification are performed with respect to the second stereo image FRIb using the disparity map 520.

That is, object detection and verification are performed with respect to the first to fourth lanes 538a, 538b, 538c and 538d, the construction area 532, the first preceding vehicle 534 and the second preceding vehicle 536 of the image 530.

With image processing, the vehicle assistance apparatus 100 may acquire various surrounding information of the vehicle, such as peripheral objects or the positions of the peripheral objects, using the sensor unit 155, as sensor information.

The remote start restriction element can be detected through the vehicle peripheral information. In detail, the vehicle peripheral information may store a traffic sign indicating the remote start unavailable area by regulation, area at which the exhaust gas emission of the vehicle is harmful, information about a person positioned in the vicinity of the vehicle, and the like.

In other words, the vehicle assistance apparatus 100 can accurately detect the remote start restriction element through the sensor unit 155.

Next, the vehicle assistance apparatus 100 may further include a display unit for displaying a graphic image relating to the remote start restriction function.

The display unit 180 may include a plurality of displays.

In detail, the display unit 180 may include a first display 180a for projecting and displaying a graphic image onto and on a vehicle windshield W. That is, the first display 180a is a head up display (HUD) and may include a projection module for projecting the graphic image onto the windshield W. The graphic image projected by the projection module may have predetermined transparency. Accordingly, a user may simultaneously view the front and rear sides of the graphic image.

The graphic image may overlap the image projected onto the windshield W to achieve augmented reality (AR).

The display unit may include a second display 180b separately provided inside the vehicle to display an image of the vehicle assistance function.

In detail, the second display 180b may be a display of a vehicle navigation apparatus or a cluster positioned at an internal front side of the vehicle.

The second display 180b may include at least one selected from among a Liquid Crystal Display (LCD), a Thin Film Transistor LCD (TFT LCD), an Organic Light Emitting Diode (OLED), a flexible display, a 3D display, and an e-ink display.

The second display 180b may be combined with a touch input unit to achieve a touchscreen.

In addition, the vehicle assistance apparatus 100 may further include an audio output unit 185 and a power supply 190.

In detail, the audio output unit 185 can output a message to the audio confirming the description of the remote start restriction function, whether or not the remote start restriction function is performed, and the like. In other words, the vehicle assistance apparatus 100 may supplement the description of the function of the remote start restriction function through the audio output of the audio output unit 185 together with the visual indication through the display unit 180.

In addition, the power supply 190 may receive power and supply power necessary for operation of the components under control of the processor 170.

Lastly, the vehicle assistance apparatus 100 may include the processor 170 for controlling overall operation of the units of the vehicle assistance apparatus 100.

In addition, the processor 170 may control at least some of the components described with reference to FIG. 3 in order to perform the application program. Further, the processor 170 may operate by combining at least two of the components included in the vehicle assistance apparatus 100es, in order to perform the application program.

The processor 170 may be implemented in a hardware manner using at least one selected from among Application Specific Integrated Circuits (ASICs), Digital Signal Processors (DSPs), Digital Signal Processing Devices (DSPDs), Programmable Logic Devices (PLDs), Field Programmable Gate Arrays (FPGAs), controllers, microcontrollers, microprocessors 170, and electric units for the implementation of other functions.

The processor 170 may be controlled by the controller or may control various functions of the vehicle through the controller.

The processor 170 may control overall operation of the vehicle assistance apparatus 100 in addition to operation related to the application programs stored in the memory 140. The processor 170 may process signals, data, information, etc. through the above-described components or perform the application programs stored in the memory 170 to provide appropriate information or functions to the user.

Hereinafter, a method of performing the remote start restriction function in accordance with the first restrict level detection by the units described below will be described with reference to FIGS. 8 to 14.

First, when the vehicle assistance apparatus 100 receives the remote start request signal from the user's mobile terminal 600, the vehicle assistance apparatus 100 can perform the remote start restriction function (S101).

In detail, the user can transmit a signal requesting the remote start through the mobile terminal 600, and the remote start request signal may further include the request information for performing other functions of the vehicle.

For example, the remote start request signal may further include a request for performing at least one function of temperature control inside the vehicle, air conditioning control, air purification and defrost function.

The vehicle assistance apparatus 100 can receive such a remote start request signal through the communication unit 120.

Upon receiving the remote start request signal, the vehicle assistance apparatus 100 can acquire the vehicle peripheral information. (S102).

More specifically, the vehicle assistance apparatus 100 can receive the communication information through the communication unit 120 and acquire the vehicle peripheral information. In addition, the vehicle assistance apparatus 100 may receive sensor information and navigation information through the interface unit 130 to acquire vehicle peripheral information.

In addition, the vehicle assistance apparatus 100 senses the vehicle periphery object through the sensor unit 155, and the processor 170 can analyze it to acquire the vehicle peripheral information.

Next, the vehicle assistance apparatus 100 can detect whether or not the acquired vehicle peripheral information includes the remote start restriction element. (S103)

For example, the processor 170 can be detected a state of the position where the vehicle is stopped is in the idling restriction area by regulation in the vehicle peripheral information, a state of the position where the vehicle is stopped is a situation where the smoke of the vehicle is harmful to the peripheral such as a closed space such as an indoor space or a parking tower, a state where person is around the vehicle, or the like as a remote start restriction element.

If the remote start restriction element is not detected in the vehicle peripheral information, the processor 170 may perform the remote start function in accordance with the remote start request signal. (S104)

In detail, the processor 170 controls the power source driving unit to operate through the interface unit 130, and can control so as to perform the other functions included in the remote start request signal.

If a remote start restriction element is detected, the vehicle assistance apparatus 100 can determine the level of the detected remote start restriction element. (S105)

More specifically, the processor 170 may search the memory 140 to determine to which level the detected remote start restriction element corresponds.

For example, the processor 170 may determine that the detected remote start restriction situation corresponds to at least one of first restriction level at which the vehicle is positioned within the remote start unavailable area by regulation, a second restriction level at which the exhaust gas emission of the vehicle is harmful, and a third restriction level at which a person other than the driver is positioned within a predetermined distance of the vehicle.

Figure 9A:
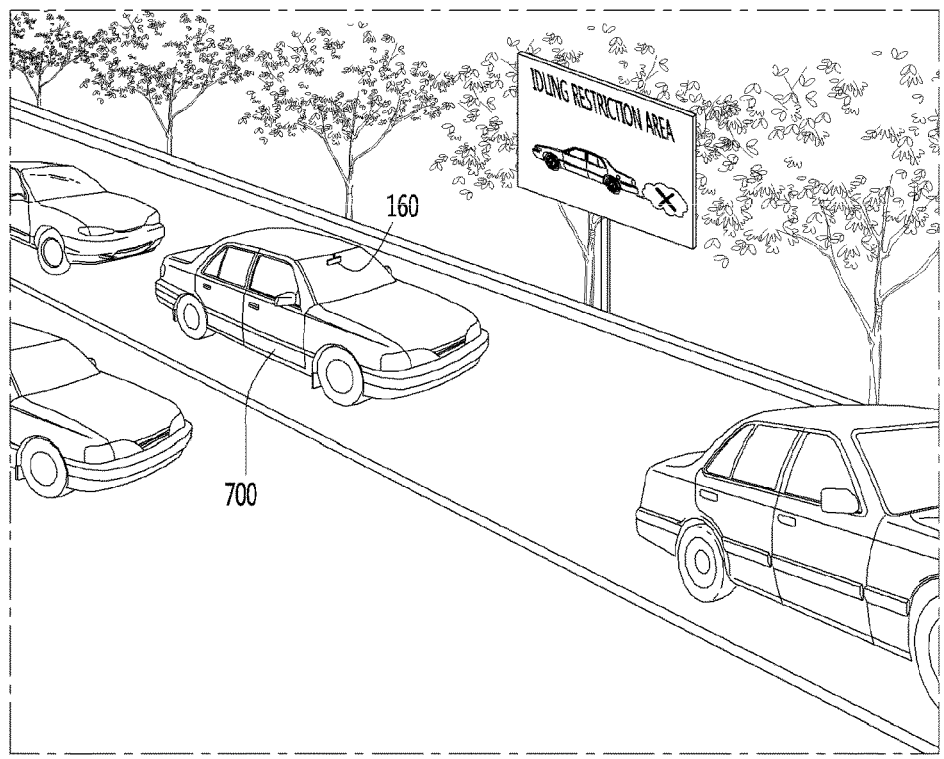
FIGS. 9A and 9B are examples of remote start restriction elements corresponding to a first restrict level according to an embodiment of the present invention.

In detail, with reference to FIG. 9A, when the processor 170 detects a mark indicating an idling restriction area in the image acquired by the camera as a remote start restriction element, it is possible to determine that the mark indicating the detected idling restriction area by searching the memory corresponds to the first restriction level.

Figure 9B:
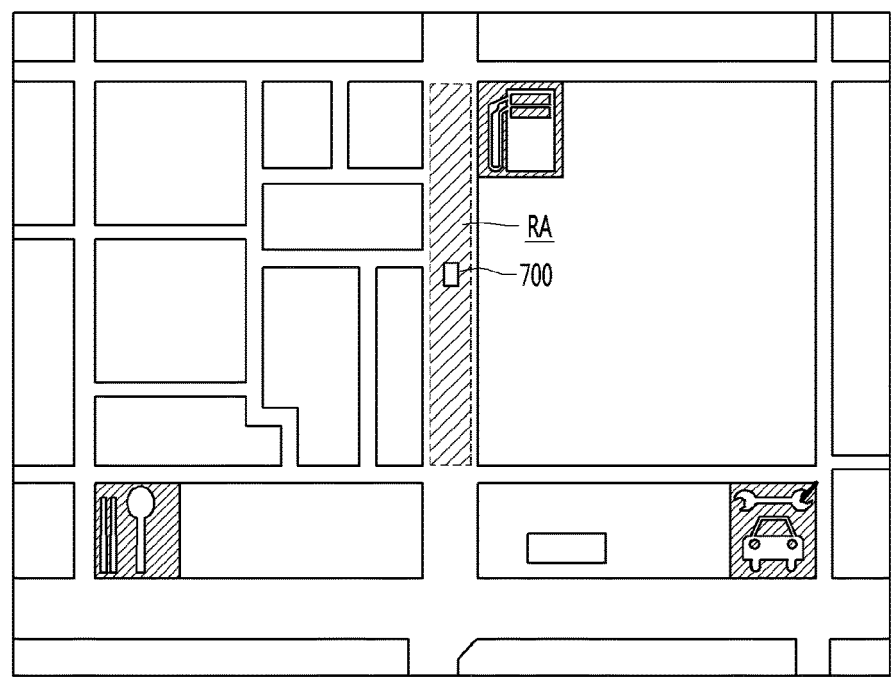

Alternatively, with reference to FIG. 9B, when the processor 170 receives the information that the position where the vehicle is stopped is in an area (RA) where idling is restricted, it is determined that the idling restriction area corresponds to the first restriction level by searching the memory.

If the detected remote start restriction element corresponds to another restriction level, the processor 170 can perform the remote start restriction function according to the corresponding restriction level. (S106)

If the remote start restriction element is determined to be the first restrict level, the vehicle assistance apparatus 100 can perform the remote restriction start function of the first restrict level. (S107) For example, the processor 170 may keep the start OFF.

Then, the vehicle assistance apparatus 100 can transmit a feedback signal to the mobile terminal 600 in response to the start rejection. (S108)

Figure 10:
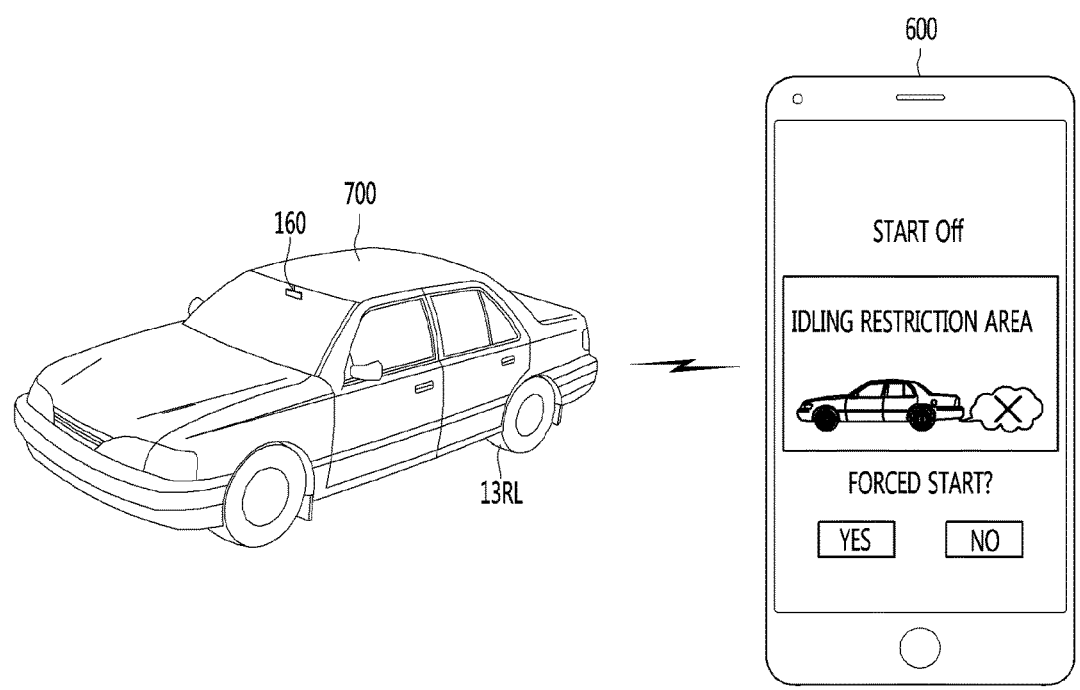
FIG. 10 shows a state where the remote start restriction function is performed when the first restriction level is detected according to the embodiment of the present invention.

In detail, with reference to FIG. 10, the processor 170 transmits information indicating that the vehicle is not started due to the start restriction element to the mobile terminal 600 through the communication unit 120 so that the processor 170 can control so that the mobile terminal 600 outputs the information.

However, the user can input the forced start request through the mobile terminal 600, and in a case where the user desires to start the remote start even in the first restrict level situation, the forced start request can be inputted through the mobile terminal 600.

The vehicle assistance apparatus 100 can receive the forcible start request signal through the communication unit 120 and turn on the start even in the first restrict level situation.

In addition, the vehicle assistance apparatus 100 can continuously detect the position of the mobile terminal 600 and detect whether the mobile terminal 600 has entered a predetermined range from the vehicle. (S109)

Figure 11:
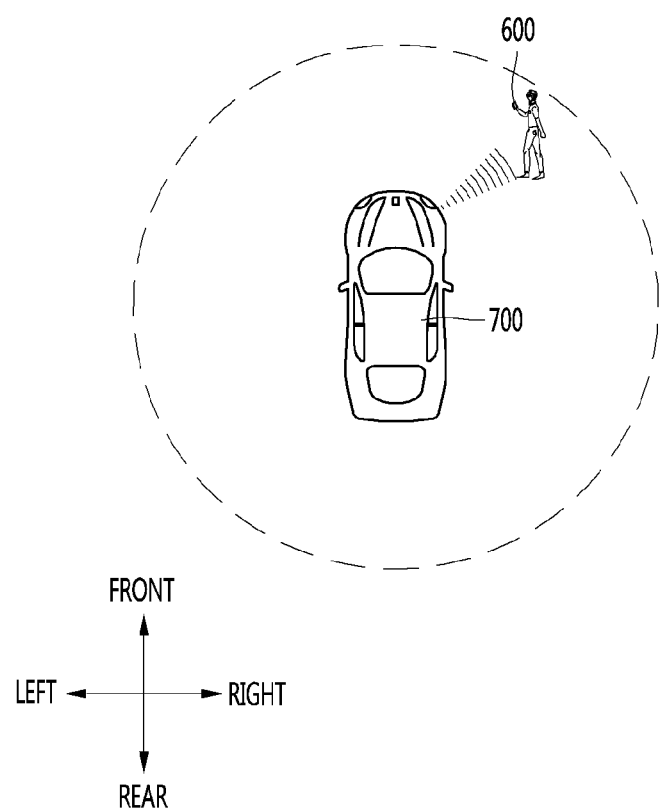
FIGS. 11 to 12 are views showing a state where the remote start function is selectively performed according to the position of the mobile terminal according to the embodiment of the present invention.

For example, with reference to FIG. 11, the processor 170 may communicate with the mobile terminal 600 through the communication unit 120 in a short distance to acquire the location of the mobile terminal 600 and thus it is possible to detect that the mobile terminal 600 is positioned within a predetermined radius from the vehicle.

Then, the vehicle assistance apparatus 100 can turn on the start if it detects that the mobile terminal 600 is within a predetermined distance from the vehicle. (S110)

The reason for turning on the start is to start the vehicle for the user's convenience when the user enters within a distance determined by the user to be able to drive the vehicle within the idling restriction time.

At this time, the vehicle assistance apparatus 100 can transmit the start ON state and the idle restriction time information to the mobile terminal 600 to guide the user to comply with the regulations.

Figure 12:
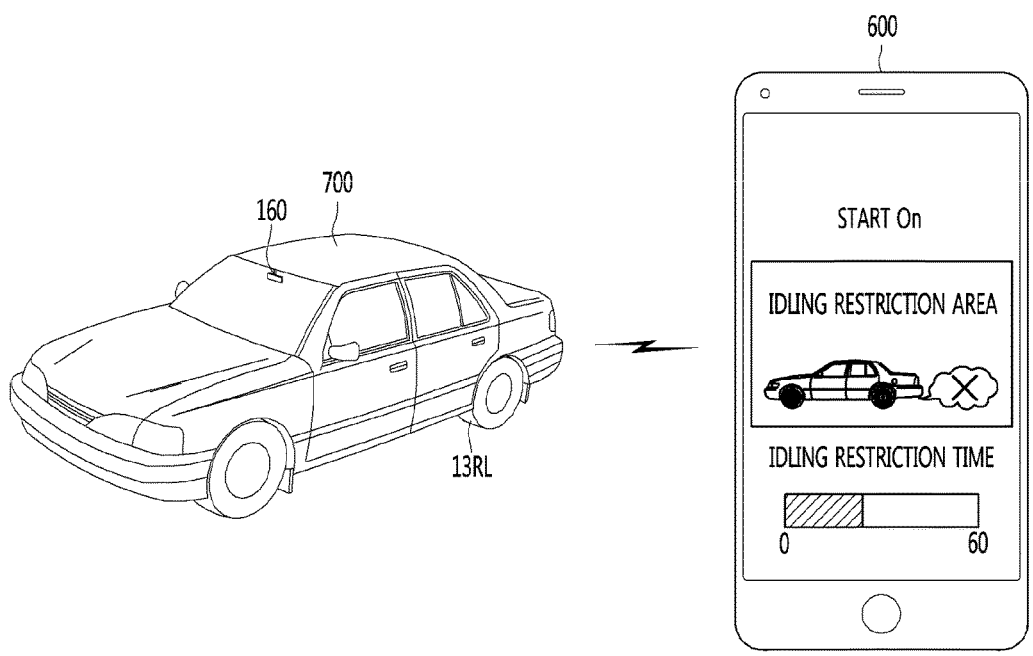

For example, with reference to FIG. 12, the vehicle assistance apparatus 100 transmits information on the performing of the remote start restriction function to the mobile terminal 600 to control so as to display the fact that the start is in the on-state, the fact that the vehicle is in the idling restriction area, the idling restriction time, the time when the vehicle is idling in the real time, and the like on the mobile terminal 600.

In addition, the vehicle assistance apparatus may turn off the start before the idle restriction time of the regulation has elapsed.

On the other hand, as described above, the remote start request signal may include a request for other function performing.

The vehicle assistance apparatus 100 can detect whether there is a request for controlling other functions of the vehicle in the remote start request signal. (S111) The vehicle assistance apparatus 100 can perform other functions while restricting the state where the start is off. (S112)

For example, the vehicle assistance apparatus 100 can control the performing of other functions by distinguishing the start ON state from the start OFF state.

For example, when the user requests control of the internal temperature of the vehicle, the processor 170 may perform the temperature control function to be different from the start ON state and the start OFF state, respectively.

More specifically, when there is a vehicle heating request, the processor 170 can heat the vehicle through the air conditioner driving unit in the start ON state to increase the temperature. If the start restriction state is established, the processor 170 may close the window and shut off the inside/outside air, and then drive the seat heating line of the vehicle.

In addition, when there is a request for cooling the vehicle, the processor 170 can cool the vehicle through the air conditioner driving unit in the start ON state to lower the temperature. If the processor 170 is in the start restriction state, the processor 170 may open the window, the sunroof, the inside/outside air, and the like. However, windows, sunroofs, or the like can be opened only at a minimum if there is rain or snow or there are people around the vehicle.

Figure 13A:
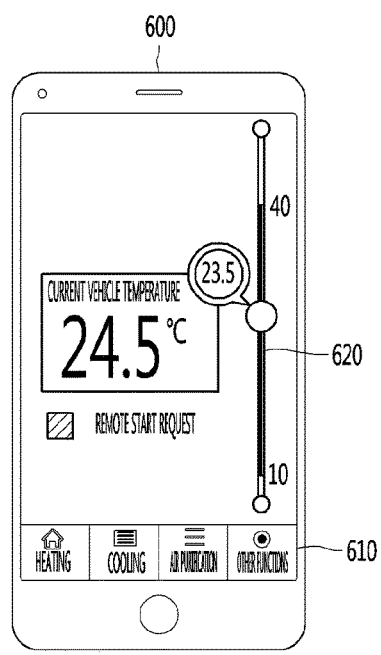
FIGS. 13A to 13B are views showing a state where the temperature in the vehicle is controlled according to the remote start restriction function according to the embodiment of the present invention.

At this time, since the processor 170 can perform the temperature control in the start ON state when there is no remote start restriction element, the processor 170 can further provide an interface for setting the target temperature by transmitting the information to the mobile terminal 600. With reference to FIG. 13A, the mobile terminal 600 receives information indicating that there is no remote start restriction element from the vehicle assistance apparatus 100 and can display the current vehicle temperature, a possible target temperature interval 620, and the like. The user can set the desired temperature within the target temperature range.

The processor 170 can provide the interface for setting the target temperature by transmitting the information to the mobile terminal 600 because the temperature control can be performed in the start OFF state when there is the remote start restriction element.

Figure 13B:
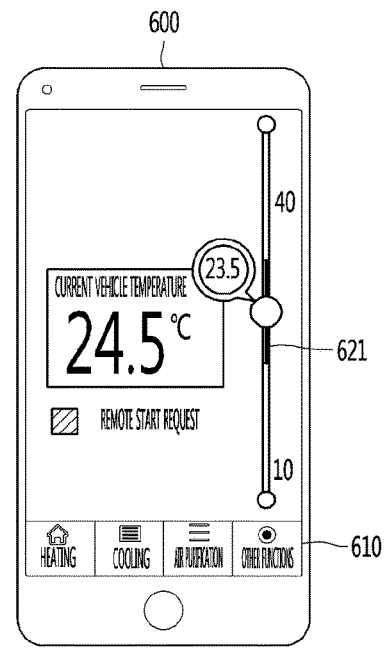

With reference to FIG. 13B, the mobile terminal 600 receives information indicating that there is no remote start restriction element from the vehicle assistance apparatus 100 and can display the current vehicle temperature, a possible target temperature interval 621, or the like. The desired temperature can be set within the target temperature range by the user.

In addition, the vehicle assistance apparatus 100 can perform other functions for a suitable state for the user to operate even in the start OFF state.

Figure 14:
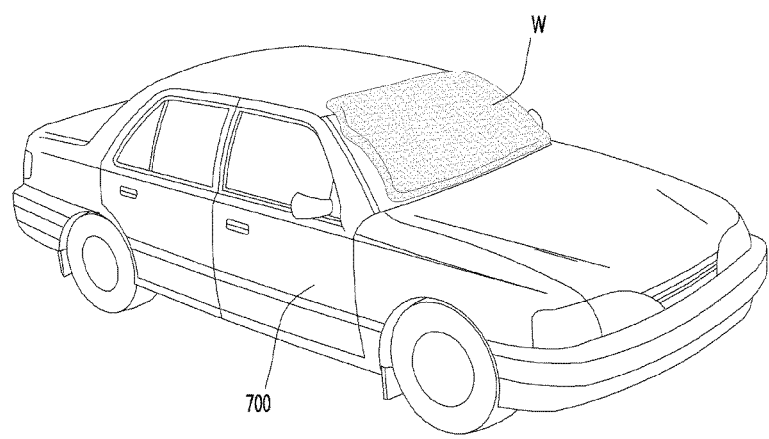
FIG. 14 is a view showing a state where other functions are performed when the remote start restriction function according to the embodiment of the present invention is performed.

More specifically, with reference to FIG. 14, when the vehicle's glass W is frozen or snow is detected, even if the vehicle is in the start OFF state, the vehicle assistance apparatus 100 controls the vehicle condition so that the driver can appropriately drive the vehicle by performing a defrosting function.

Hereinafter, a method in which the vehicle assistance apparatus 100 performs the remote start restriction function in accordance with the second restrict level detection will be described with reference to FIGS. 15 to 18.

First, when the vehicle assistance apparatus 100 receives the remote start request signal from the user's mobile terminal 600, the vehicle assistance apparatus 100 can perform the remote start restriction function. (S301)

In detail, the user can transmit a signal requesting the remote start through the mobile terminal 600, and request information for performing other functions of the vehicle may further include in the remote start request signal.

For example, the remote start request signal may further include a request signal for controlling a function of at least one of a temperature control, an air conditioning control, an air purifying, and defroster functions inside the vehicle.

The vehicle assistance apparatus 100 can receive such a remote start request signal through the communication unit 120.

Upon receiving the remote start request signal, the vehicle assistance apparatus 100 can acquire the vehicle peripheral information. (S302)

More specifically, the vehicle assistance apparatus 100 can receives the communication information through the communication unit 120 and include the communication information in the vehicle peripheral information, and receive the sensor information and the navigation information through the interface unit 130 and include the sensor information and the navigation information in the vehicle surrounding information.

In addition, the vehicle assistance apparatus 100 can detect a vehicle peripheral object through a distance sensor and/or a camera, and the processor 170 can analyze the vehicle peripheral object to acquire vehicle peripheral information.

Next, the vehicle assistance apparatus 100 can detect whether or not the acquired vehicle peripheral information includes the remote start restriction element. (S303)

For example, the processor 170 can detect the fact that the position where the vehicle is stopped is in the idling restriction area by regulation, the fact that the position where the vehicle is stopped is in an enclosed space such as an indoor space and a parking tower, the fact that the smoke of the vehicle is harmful, the fact that people are at peripheral of the vehicle, or the like as a remote start restriction element.

If the remote start restriction element is not detected in the vehicle peripheral information, the processor 170 may perform the remote start function in accordance with the remote start request signal. (S304)

In detail, the processor 170 controls the power source driving unit to operate through the interface unit 130, and can control the other functions included in the remote start request signal.

If a remote start restriction element is detected, the vehicle assistance apparatus 100 may determine the level of the detected remote start restriction element. (S305)

More specifically, the processor 170 may search the memory 140 to determine to which level the detected remote start restriction element corresponds.

For example, the processor 170 may determine that the detected remote start restriction situation corresponds to at least one of first restriction level at which the vehicle is positioned within the remote start unavailable area by regulation, a second restriction level at which the exhaust gas emission of the vehicle is harmful, and a third restriction level at which a person other than the driver is positioned within a predetermined distance of the vehicle.

Figure 16A:
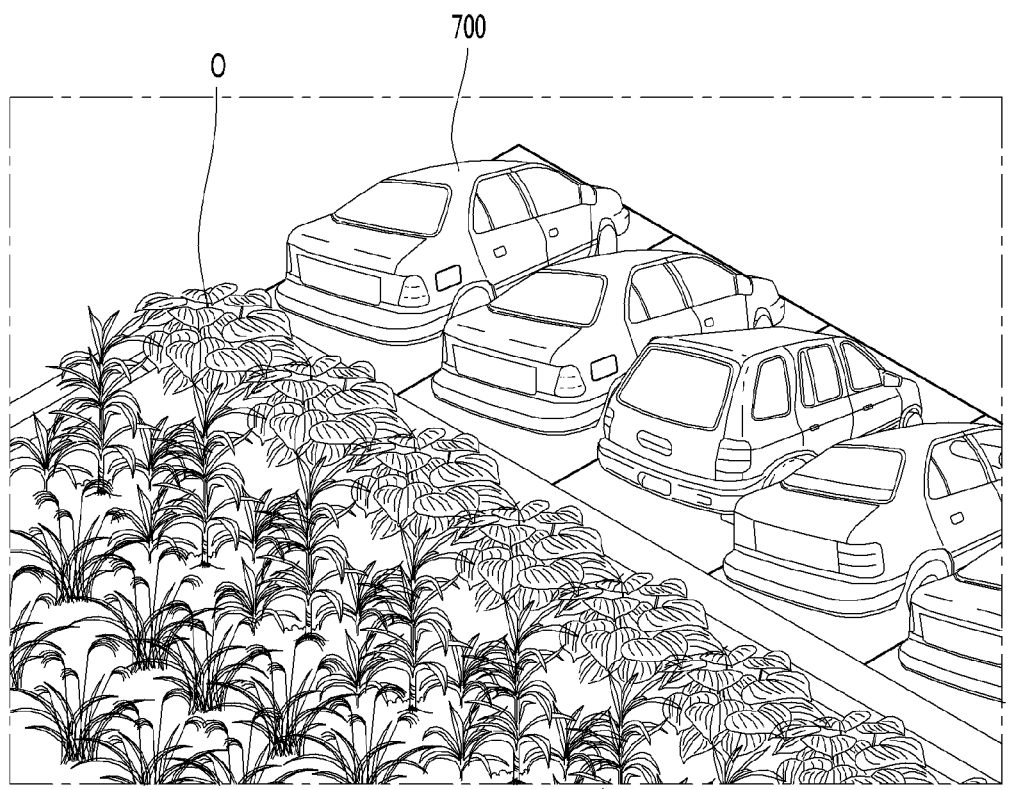
FIGS. 16A to 16C are diagrams for explaining a second restriction level detection situation according to the embodiment of the present invention.

In detail, with reference to FIG. 16A, when the processor 170 detects that a flower bed O is present behind the vehicle in the image acquired by the camera, the processor 170 can determine that the exhaust gas emission of the vehicle is harmful.

Figure 16B:
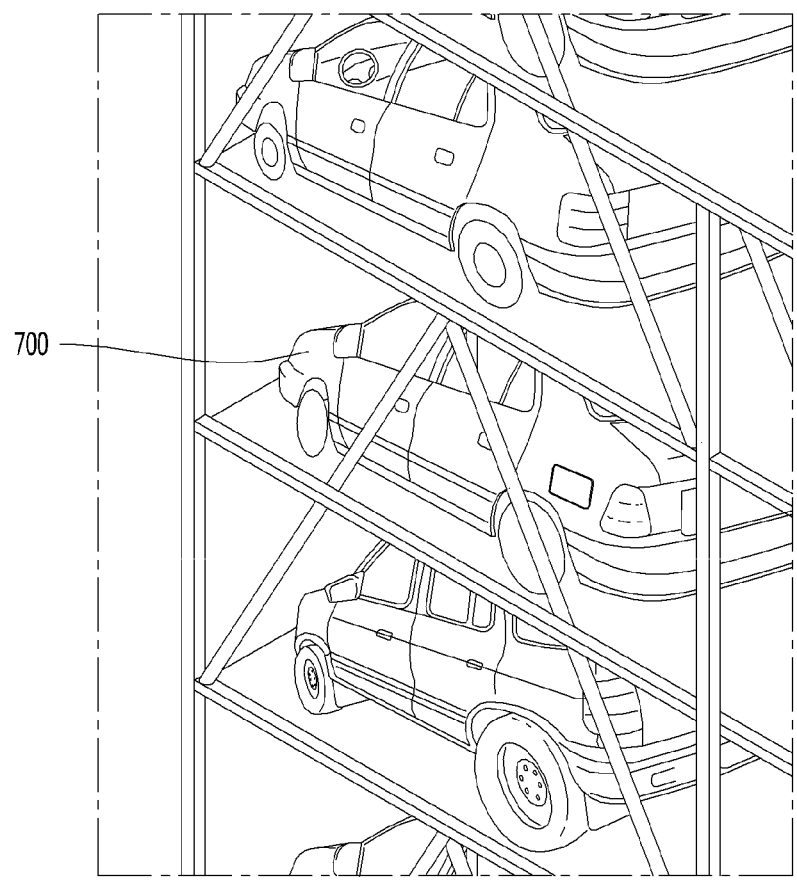

In addition, with reference to FIG. 16B, when the processor 170 detects that the position where the vehicle is stopped is a parking tower through the image acquired by the camera or through the communication unit 120 since the exhaust gas emission of the vehicle is harmful, It can be determined that it corresponds to the restriction level.

Figure 16C:
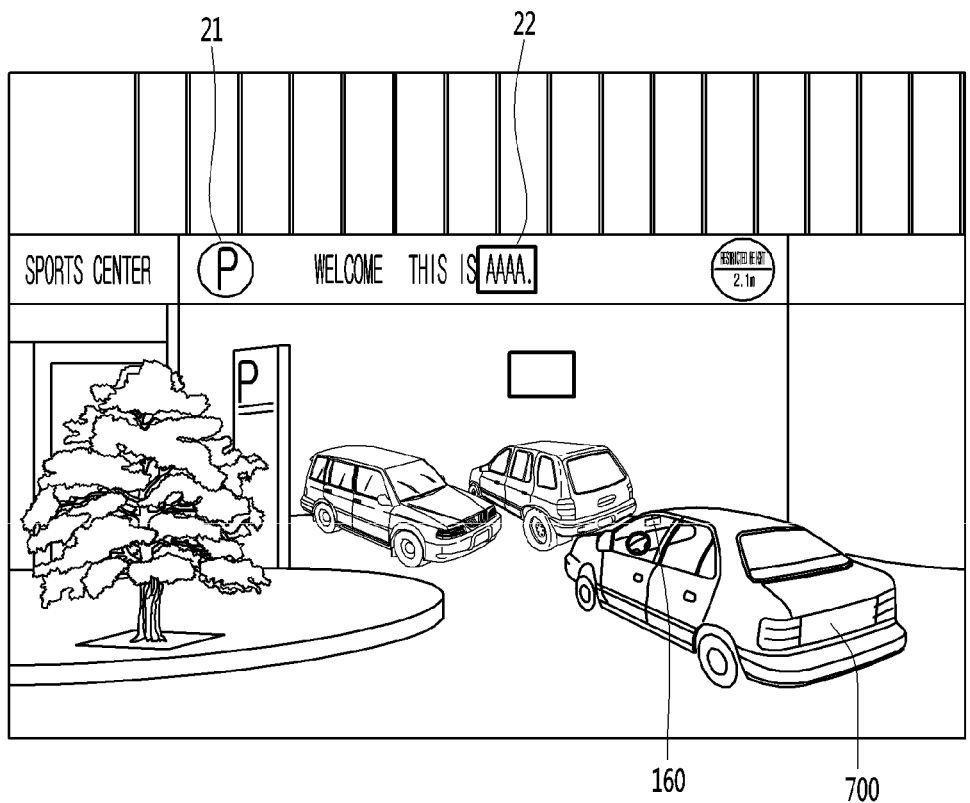

In addition, with reference to FIG. 16C, when the processor 170 detects that the position where the vehicle is stopped from the image acquired by the camera is the indoor parking spaces 21 and 22 is in an indoor parking lot, since the exhaust gas emission from the vehicle is harmful, it is determined that the situation corresponds to the second restriction level.

If the detected remote start restriction element corresponds to another restriction level, the processor 170 can perform the remote start restriction function according to the corresponding restriction level. (S306)

If the remote start restriction element is determined as the second restrict level, the vehicle assistance apparatus 100 can perform the restriction start function. (S307) In other words, the processor 170 can activate the start in a restricted state.

If it is determined to be the second restriction level, the processor 170 may perform the restriction start function as follows.

Figure 17:
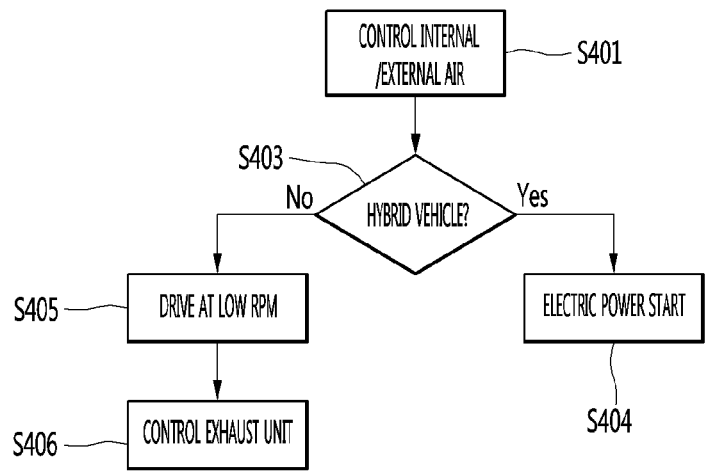
FIG. 17 is a flowchart showing the performing of the remote start restriction function upon detection of the second restriction level according to the embodiment of the present invention.

With reference to FIG. 17, first, the processor 170 may block the inside/outside of the vehicle. (S401) For example, the processor 170 may seal the windows, the sunroof, and the air conditioner.

In addition, the vehicle assistance apparatus 100 can activate the start to be different according to the driving source of the vehicle. (S403)

More specifically, if the vehicle on which the vehicle assistance apparatus 100 is mounted is a hybrid vehicle, the vehicle assistance apparatus 100 can activate the start of the vehicle using only electric power. (S404)

If the vehicle on which the vehicle assistance apparatus 100 is mounted is an internal/external combustion engine, it is possible to control the power source driving unit to start at a low RPM, thereby minimizing generation of smoke. (S405)

The vehicle assistance apparatus 100 can control the exhaust unit to minimize the smoke discharge. (S406)

Figure 18:
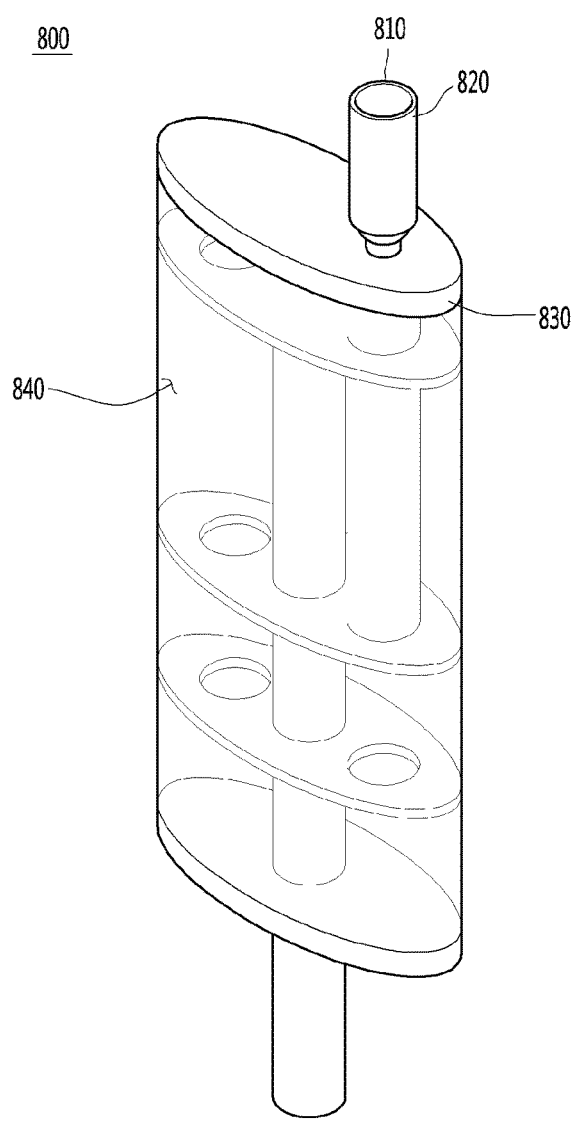
FIG. 18 is a view showing an example of a muffler structure for implementing the remote start restriction function according to the embodiment of the present invention.

In detail, with reference to FIG. 18, the exhaust portion 800 of the vehicle may include a smoke exhaust port 820, an exhaust port opening/closing portion 810, a smoke accumulation space 840, and a smoke exhaust direction controller 850.

The vehicle assistance apparatus 100 can control the exhaust unit 800 of the vehicle to suppress the emission of the smoke around the vehicle. More specifically, the vehicle assistance apparatus 100 can close the exhaust port through the exhaust port opening/closing portion 810 of the vehicle and accumulate the generated smoke in the smoke accumulation space.

Thereafter, when the vehicle assistance apparatus 100 is out of the second restriction level state, the exhaust port opening/closing portion 810 can be controlled to open the exhaust port 820 and to exhaust the generated smoke. At this time, the smoke may be burned once or cleaned and then discharged before the ambient pollution is prevented.

Then, the vehicle assistance apparatus 100 can transmit a feedback signal to the mobile terminal 600 in accordance with the performing of the restriction start function. (S308)

In detail, the processor 170 transmits information indicating the restricted start state to the mobile terminal 600 through the communication unit 120 to control the mobile terminal 600 to output such information. More specifically, the vehicle assistance apparatus 100 can indicate that the start is off when a predetermined time elapses during performing of the restriction start function.

In other words, the processor 170 can determine whether a predetermined time has elapsed in the restricted start state, and can turn off the start when the predetermined time has elapsed. (S308 and S309). For example, the processor 170 may turn off the start if it is determined that the smoke is excessively accumulated in the smoke accumulation space of the vehicle and it is difficult to accumulate any more.

On the other hand, as described above, the remote start request signal may include a request for other function performing.

The vehicle assistance apparatus 100 can detect whether there is a request for controlling other functions of the vehicle in the remote start request signal. (S311) The vehicle assistance apparatus 100 can perform other functions by restricting in a state where the start is off. (S312)

For example, the vehicle assistance apparatus 100 can control the performing of other functions by distinguishing the start ON state from the start OFF state.

For example, when the user requests control of the internal temperature of the vehicle, the processor 170 may perform the temperature control function to be different from the start ON state and the start OFF state, respectively.

More specifically, when there is a vehicle heating request, the processor 170 can heat the vehicle through the air conditioner driving unit in the start ON state to increase the temperature. If the start restriction state is established, the processor 170 can close the window and shut off the inside/outside air, and then drive the seat heating line of the vehicle. At this time, since the driving power can be supplemented if the air conditioner is in the restricted start state, the air conditioner driving unit may be controlled within a restricted range.

In addition, when there is a request for cooling the vehicle, the processor 170 can cool the vehicle through the air conditioner driving unit in the start ON state to lower the temperature. If the processor 170 is in the start restriction state, the processor 170 may open the window, the sunroof, the inside/outside air, and the like. However, windows, sunroofs, or the like can be opened only at a minimum if there is rain or snow or there are people around the vehicle. At this time, since the driving power can be supplemented if the air conditioner is in the restricted start state, the air conditioner driving unit may be controlled within a restricted range.

Figure 19A:
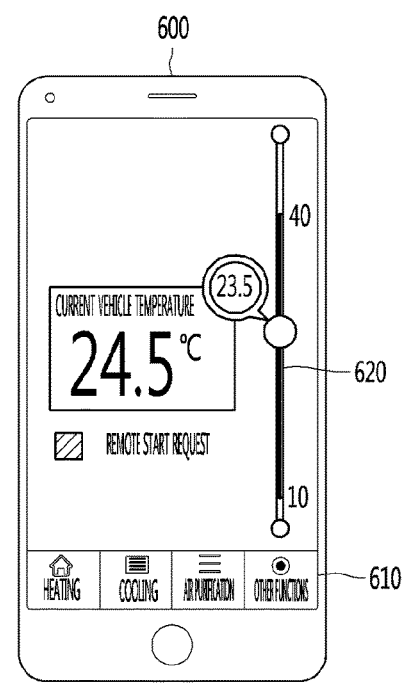
FIGS. 19A to 19B are views showing a state where the in-vehicle temperature is controlled in the remote start restriction function according to the embodiment of the present invention.

At this time, since the processor 170 can freely control the temperature in the start ON state when there is no remote start restriction element, the processor 170 transmits information indicating that the temperature can be adjusted in a wide temperature range to the mobile terminal 600, it is possible to further provide an interface for setting the target temperature. With reference to FIG. 19A, the mobile terminal 600 receives information indicating that there is no remote start restriction element from the vehicle assistance apparatus 100 and can display the current vehicle temperature, a possible target temperature interval 620, and the like. The user can set the desired temperature within the target temperature range.

Figure 19B:
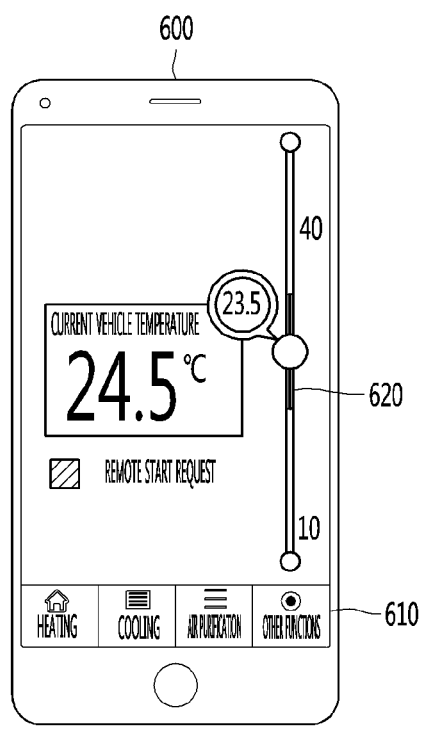

Since the processor 170 has to control the temperature in the restricted start state in a case where there is the remote start restriction element, the processor 170 transmits information indicating that the temperature can be adjusted in a relatively narrow temperature range to the mobile terminal 600, It is possible to provide an interface for setting the target temperature. With reference to FIG. 19B, the mobile terminal 600 receives information indicating that there is no remote start restriction element from the vehicle assistance apparatus 100 and can display the current vehicle temperature, a possible target temperature interval 621, or the like. The user can set the desired temperature within the target temperature range.

In addition, the vehicle assistance apparatus 100 can perform other functions for a suitable state for the user to operate, even in the restricted start state.

Figure 20:
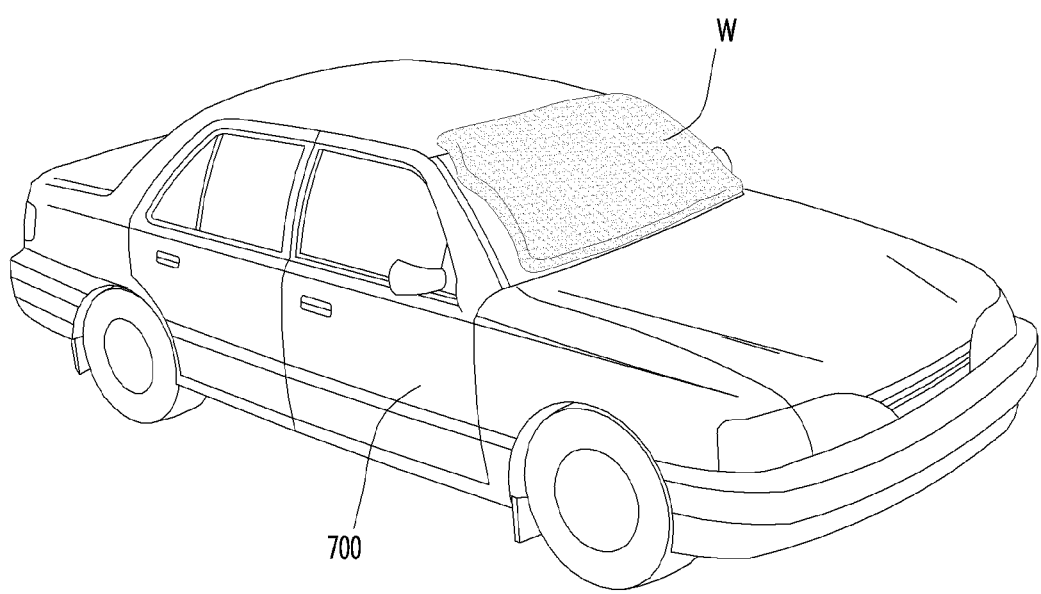
FIG. 20 is a view showing a state where other functions are performed when the remote start restriction function according to the embodiment of the present invention is performed.
Figure 21:
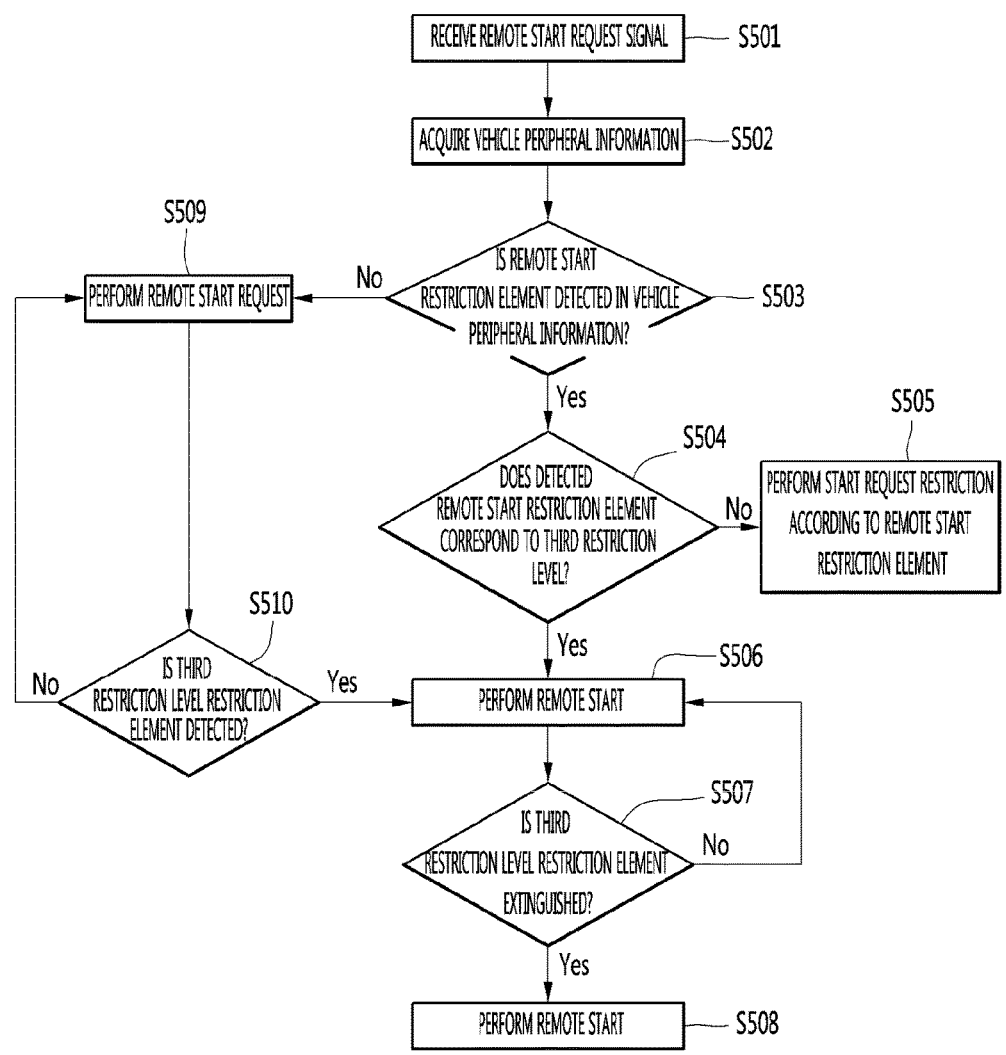
FIG. 21 is a flowchart for explaining a process of performing the remote start restriction function according to the third restriction level detection according to the embodiment of the present invention.

In detail, with reference to FIG. 20, when the vehicle's glass W is frozen or snow is detected, even if the vehicle is in the start OFF state, the vehicle assistance apparatus 100 controls the vehicle condition so that the driver can appropriately drive the vehicle by performing a defrosting function.

Hereinafter, a method in which the vehicle assistance apparatus 100 performs the remote start restriction function in accordance with the third restrict level detection will be described with reference to FIGS. 21 to 25.

First, when the vehicle assistance apparatus 100 receives the remote start request signal from the user's mobile terminal 600, the vehicle assistance apparatus 100 can perform the remote start restriction function. (S501)

In detail, the user can transmit a signal requesting the remote start through the mobile terminal 600, and the remote start request signal may further include the request information for performing other functions of the vehicle.

For example, the remote start request signal may further include a request for performing at least one function of temperature control inside the vehicle, air conditioning control, air purification and defrost function.

The vehicle assistance apparatus 100 can receive such a remote start request signal through the communication unit 120. Upon receiving the remote start request signal, the vehicle assistance apparatus 100 can acquire the vehicle peripheral information. (S502).

More specifically, the vehicle assistance apparatus 100 can receive the communication information through the communication unit 120 and include the communication information in the vehicle peripheral information and may receive sensor information and navigation information through the interface unit 130 to include in the vehicle peripheral information.

In addition, the vehicle assistance apparatus 100 can sense a vehicle peripheral object through a distance sensor and/or a camera, and processor 170 may analyze the vehicle peripheral object to acquire the vehicle perimeter information.

Next, the vehicle assistance apparatus 100 can detect whether or not the acquired vehicle peripheral information includes the remote start restriction element. (S503)

For example, the processor 170 can detect the fact that the position where the vehicle is stopped is in the idling restriction area by regulation, the fact that the position where the vehicle is stopped is in an enclosed space such as an indoor space and a parking tower, the fact that the smoke of the vehicle is harmful, the fact that people are at peripheral of the vehicle, or the like as a remote start restriction element.

If a remote start restriction element is detected, the vehicle assistance apparatus 100 can determine the level of the detected remote start restriction element. (S504)

More specifically, the processor 170 may search the memory 140 to determine to which level the detected remote start restriction element corresponds.

For example, the processor 170 may determine that the detected remote start restriction situation corresponds to at least one of first restriction level at which the vehicle is positioned within the remote start unavailable area by regulation, a second restriction level at which the exhaust gas emission of the vehicle is harmful, and a third restriction level at which a person other than the driver is positioned within a predetermined distance of the vehicle.

Figure 22:
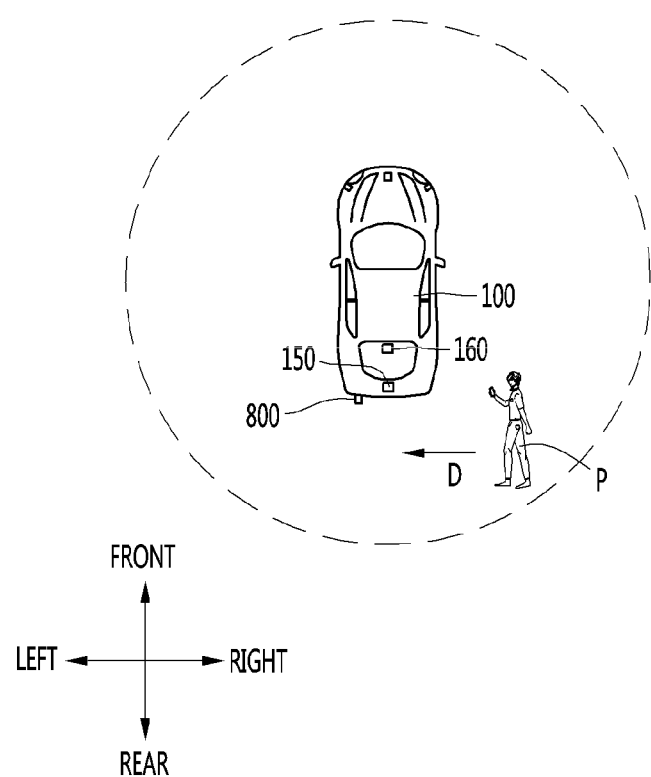
FIG. 22 is a view for explaining a third restricting level detection situation according to the embodiment of the present invention.

In detail, with reference to FIG. 22, When it is detected that the pedestrian P exists within the predetermined radius R1 of the vehicle from the image acquired by the stereo camera 160, it can be determined that the third restriction level is satisfied by the processor 170.

When the pedestrian P is present, If the vehicle is started, the pedestrian P may be surprised and the exhaust gas may damage the pedestrian P, and since the pedestrian P may harm the vehicle, in preparation for this, there is a need to restrict remote start requests.

If the detected remote start restriction element corresponds to another restriction level, the processor 170 can perform the remote start restriction function according to the corresponding restriction level. (S505)

If the remote start restriction element is determined to be the third restrict level, the vehicle assistance apparatus 100 can perform the remote restriction start function of the third restrict level. (S506) In other words, the processor 170 can activate the start in a restricted state.

In detail, If it is determined to be the third restriction level, the processor 170 may perform the restriction start function as follows.

First, the vehicle assistance apparatus 100 may control the exhaust so as not to cause a discomfort to the pedestrian. More specifically, if the vehicle on which the vehicle assistance apparatus 100 is mounted is a hybrid vehicle, the vehicle assistance apparatus 100 can activate the start of the vehicle using only electric power. If the vehicle on which the vehicle assistance apparatus 100 is mounted is an internal/external combustion engine, it is possible to control the power source driving unit to start at a low RPM, thereby minimizing generation of smoke.

In addition, the vehicle assistance apparatus 100 can control the exhaust unit to minimize the smoke discharge.

Figure 24:
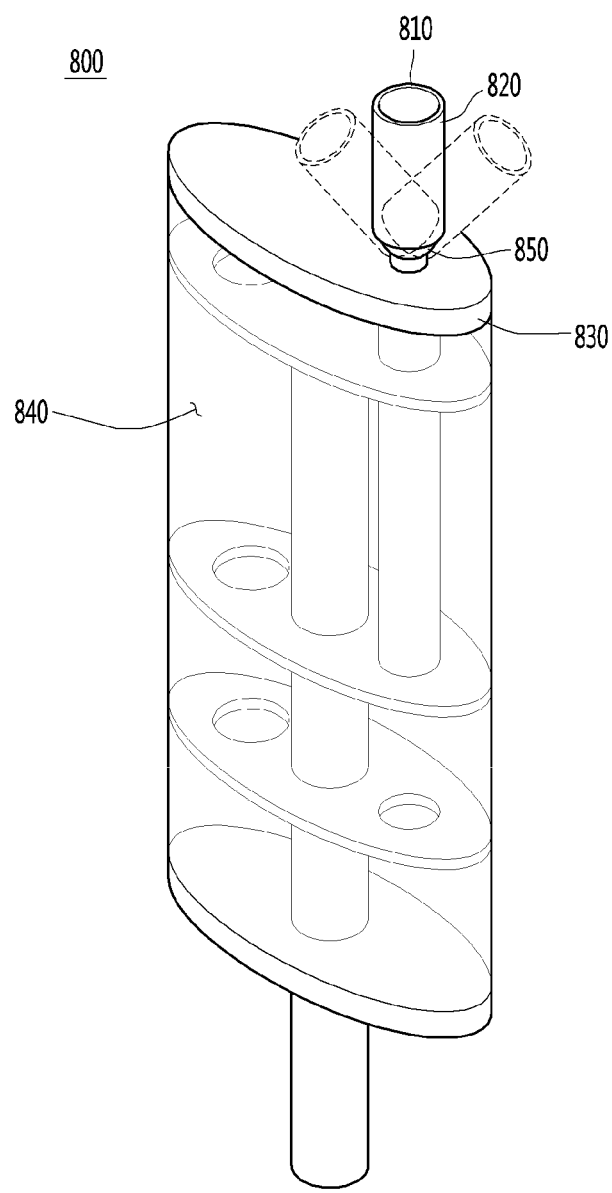
FIG. 24 is a view showing an example of a muffler structure for implementing the remote start restriction function according to the embodiment of the present invention.

In detail, with reference to FIG. 24, the exhaust portion 800 of the vehicle may include a smoke exhaust port 820, an exhaust port opening/closing portion 810, a smoke accumulation space 840, and a smoke exhaust direction controller 850.

The vehicle assistance apparatus 100 can control the exhaust unit 800 of the vehicle to suppress the emission of the smoke around the vehicle. More specifically, the vehicle assistance apparatus 100 can close the exhaust port through the exhaust port opening/closing portion 810 of the vehicle and accumulate the generated smoke in the smoke accumulation space.

Thereafter, when the vehicle assistance apparatus 100 is out of the second restriction level state, the exhaust port opening/closing portion 810 can be controlled to open the exhaust port 820 and to exhaust the generated smoke. At this time, the smoke may be burned once or cleaned and then discharged before the ambient pollution is prevented.

In addition, the vehicle assistance apparatus 100 may change the discharge direction of the smoke so that the pedestrian is not damaged by the smoke.

Figure 23:
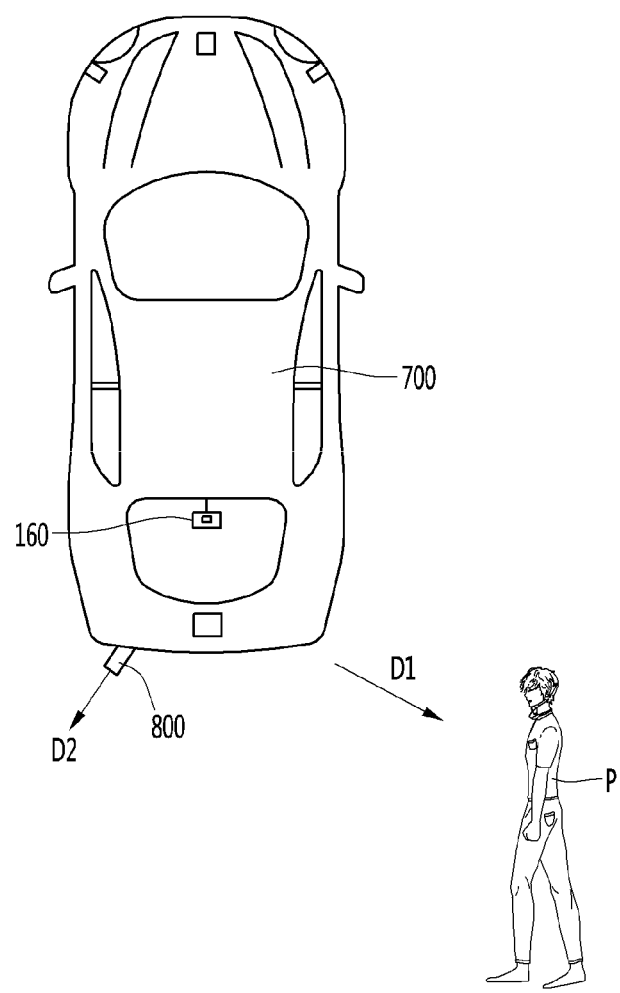
FIG. 23 is an example of the performing of the remote start restriction function upon detection of the third restriction level according to the embodiment of the present invention.

For example, with reference to FIG. 23, the vehicle assistance apparatus 100 determines the direction D2 that is as far as possible away from the separation direction D1 of the pedestrian as a smoke exhaust direction D2, controls the smoke exhaust direction controller 850, and exhausts the smoke in the determined smoke exhaust direction D2 so that the pedestrian can be prevented from suffering smoke pollution.

The vehicle assistance apparatus 100 can continuously detect whether the remote start restriction element has disappeared. (S507)

Figure 25:
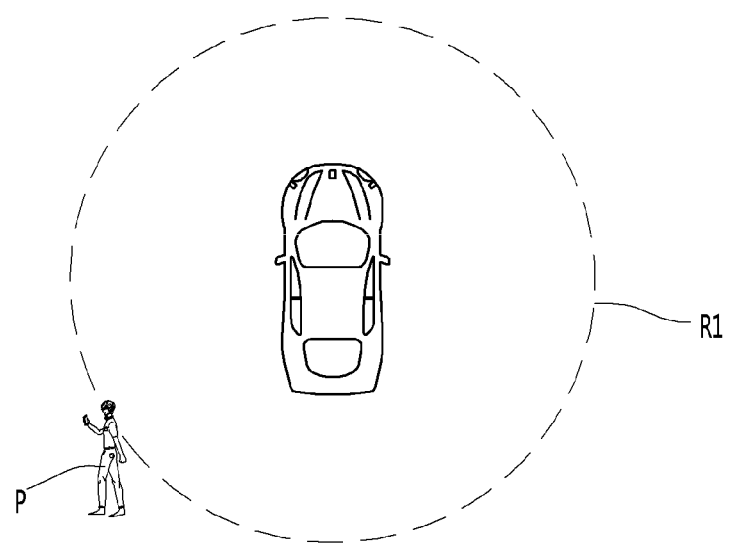
FIG. 25 shows a state where the remote start function is performed when the third restriction level disappears according to the embodiment of the present invention.

For example, with reference to FIG. 25, the vehicle assistance apparatus 100 may determine that the remote start restriction element of the third restriction level has disappeared when the vehicle assistance apparatus 100 detects that the pedestrian P deviates from a certain radius of the vehicle.

The vehicle assistance apparatus 100 can perform the remote start function according to the remote start request signal when the remote start restriction element is extinguished. (S508) The processor 170 can control the power source driving unit to operate through the interface unit 130, and control to perform other functions included in the remote start request signal.

On the other hand, the vehicle assistance apparatus 100 can continuously detect the remote start restriction element in the start ON state. (S509 and S510)

In other words, the vehicle assistance apparatus 100 can sense whether a pedestrian enters within a predetermined radius around the vehicle even in the start ON state, and perform the remote start restriction function corresponding to the third restriction level when the pedestrian is detected.

With this control, the vehicle assistance apparatus 100 can quickly block the risk that the pedestrian can apply to the vehicle without damaging the neighboring pedestrian.

Referring to FIG. 26, the above-described vehicle assistance apparatus 100 may be included in the vehicle 700.

The vehicle 700 may include a communication unit 710, an input unit 720, a sensing unit 760, an output unit 740, a vehicle drive unit 750, a memory 730, an interface 780, a controller 770, a power supply 790, a vehicle assistance apparatus 100 and AVN apparatus 400. Here, among the units included in the vehicle assistance apparatus 100 and the units of the vehicle 700, the units having the same names are described as being included in the vehicle 700.

The communication unit 710 may include one or more modules which permit communication such as wireless communication between the vehicle and the mobile terminal 600, between the vehicle and the external server 510 or between the vehicle and the other vehicle 520. Further, the communication unit 710 may include one or more modules which connect the vehicle to one or more networks.

The communication unit 710 includes a broadcast receiving module 711, a wireless Internet module 712, a short-range communication module 713, and an optical communication module 715.

The broadcast reception module 711 receives a broadcast signal or broadcast related information from an external broadcast management server through a broadcast channel. Here, the broadcast includes a radio broadcast or a TV broadcast.

The wireless Internet module 712 refers to a wireless Internet access module and may be provided inside or outside the vehicle. The wireless Internet module 712 transmits and receives a wireless signal through a communication network according to wireless Internet access technologies.

Examples of such wireless Internet access technologies include Wireless LAN (WLAN), Wireless Fidelity (Wi-Fi), Wi-Fi Direct, Digital Living Network Alliance (DLNA), Wireless Broadband (WiBro), Worldwide Interoperability for Microwave Access (WiMAX), High Speed Downlink Packet Access (HSDPA), HSUPA (High Speed Uplink Packet Access), Long Term Evolution (LTE), LTE-A (Long Term Evolution-Advanced), and the like. The wireless Internet module 712 may transmit/receive data according to one or more of such wireless Internet technologies, and other Internet technologies as well. For example, the wireless Internet module 712 may wirelessly exchange data with the external server 510. The wireless Internet module 712 may receive weather information and road traffic state information (e.g., transport protocol experts group (TPEG) information) from the external server 510.

The short-range communication module 713 is configured to facilitate short-range communication. Such short-range communication may be supported using at least one of Bluetooth™, Radio Frequency Identification (RFID), Infrared Data Association (IrDA), Ultra-Wideband (UWB), Zig-Bee, Near Field Communication (NFC), Wireless-Fidelity (Wi-Fi), Wi-Fi Direct, Wireless USB (Wireless Universal Serial Bus), and the like.

The short-range communication module 713 may form a wireless local area network to perform short-range communication between the vehicle and at least one external device. For example, the short-range communication module 713 may wirelessly exchange data with the mobile terminal 600. The short-range communication module 713 may receive weather information and road traffic state information (e.g., transport protocol experts group (TPEG) information) from the mobile terminal 600. When a user rides in the vehicle, the mobile terminal 600 of the user and the vehicle may pair with each other automatically or by performing the application of the user.

A location information module 714 acquires the location of the vehicle and a representative example thereof includes a global positioning system (GPS) module. For example, the vehicle may acquire the location of the vehicle using a signal received from a GPS satellite upon utilizing the GPS module.

The optical communication module 715 may include a light emitting unit and a light reception unit.

The light reception unit may convert a light signal into an electric signal and receive information. The light reception unit may include a photodiode (PD) for receiving light. The photodiode may convert light into an electric signal. For example, the light reception unit may receive information on a preceding vehicle through light emitted from a light source included in the preceding vehicle.

The light emitting unit may include at least one light emitting element for converting electrical signals into a light signal. Here, the light emitting element may be a Light Emitting Diode (LED). The light emitting unit converts electrical signals into light signals to emit the light. For example, the light emitting unit may externally emit light through flickering of the light emitting element corresponding to a prescribed frequency. In some embodiments, the light emitting unit may include an array of a plurality of light emitting elements. In some embodiments, the light emitting unit may be integrated with a lamp provided in the vehicle. For example, the light emitting unit may be at least one selected from among a headlight, a taillight, a brake light, a turn signal, and a sidelight. For example, the optical communication module 715 may exchange data with the other vehicle 520 through optical communication.

The input unit 720 may include a driving operation unit 721, a camera 195, a microphone 723 and a user input unit 724.

Figure 7:
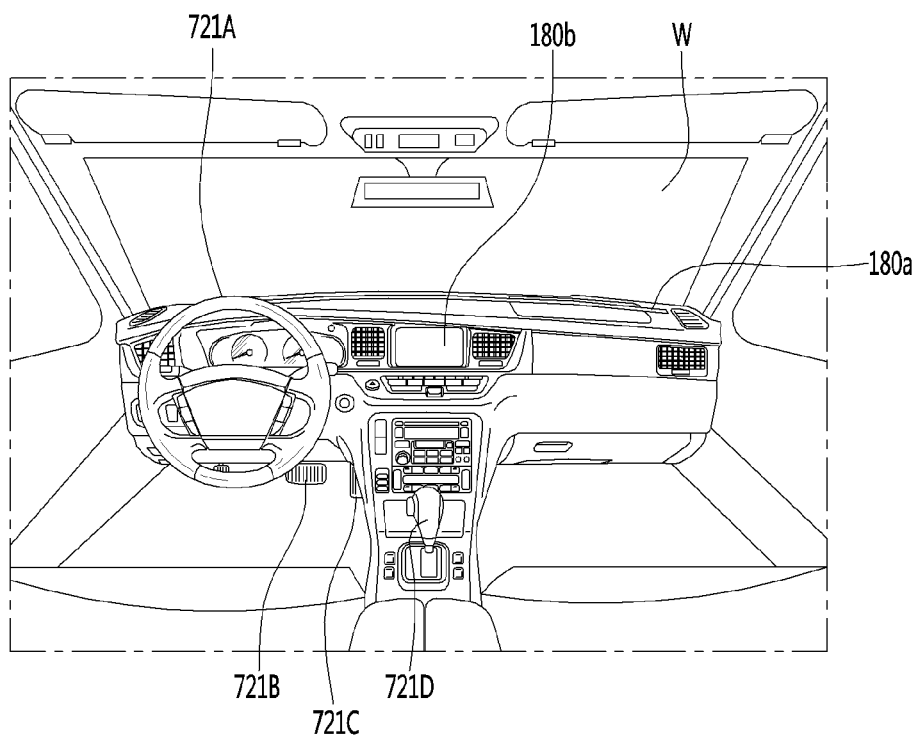
FIG. 7 is a diagram showing the inside of a vehicle having a vehicle assistance apparatus according to an embodiment of the present invention.
Figure 8:
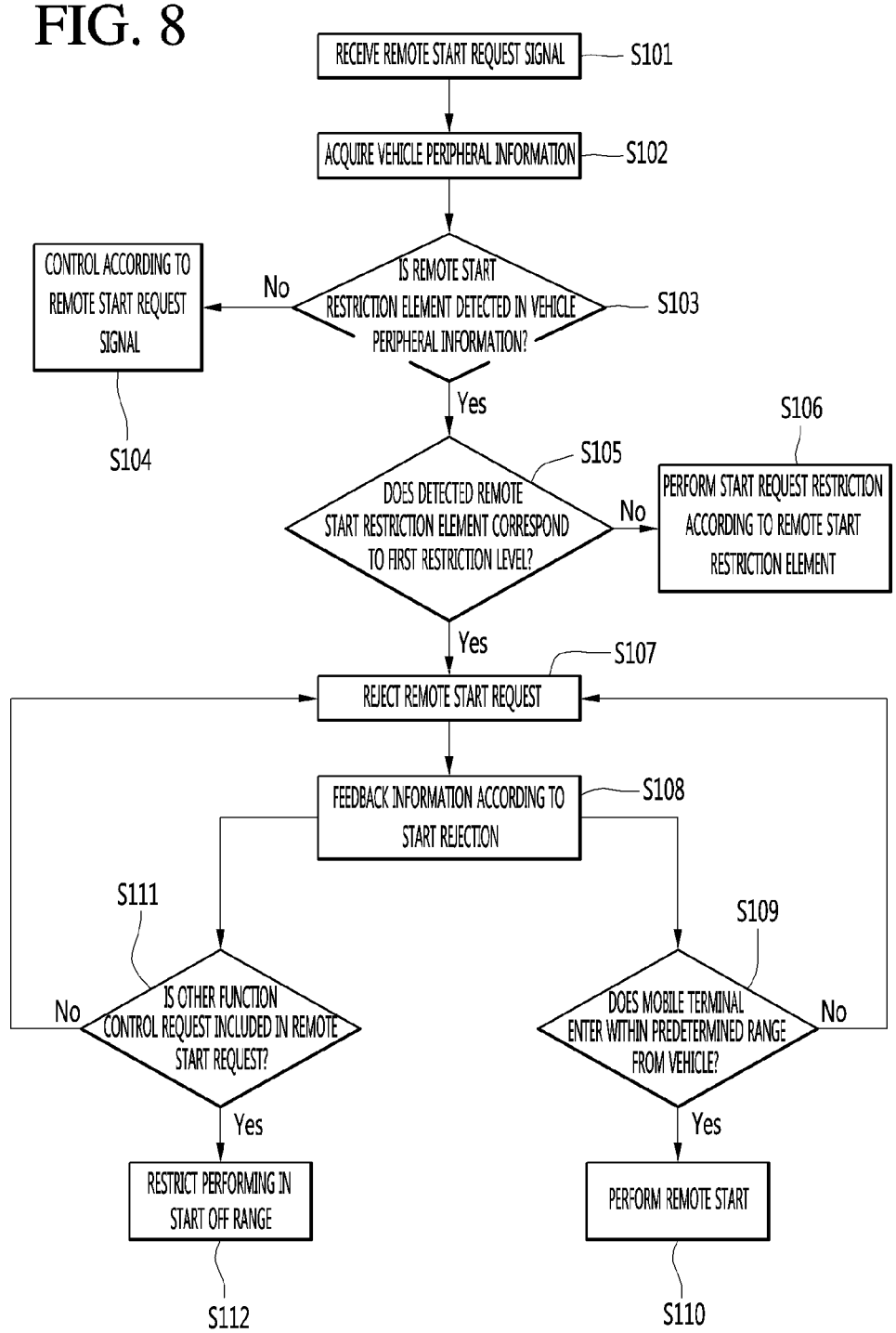
FIG. 8 is a flowchart for explaining a process of performing the remote start restriction function according to first restriction level detection according to the embodiment of the present invention.

The driving operation unit 721 receives user input for driving of the vehicle (see FIG. 7). The driving operation unit 721 may include a steering input unit 721A, a shift input unit 721D, an acceleration input unit 721C and a brake input unit 721B.

The steering input unit 721A is configured to receive user input with regard to the direction of travel of the vehicle. The steering input unit 721A may include a steering wheel using rotation. In some embodiments, the steering input unit 721A may be configured as a touchscreen, a touch pad, or a button.

The shift input unit 721D is configured to receive input for selecting one of Park (P), Drive (D), Neutral (N), and Reverse (R) gears of the vehicle from the user. The shift input unit 721D may have a lever form. In some embodiments, the shift input unit 721D may be configured as a touchscreen, a touch pad, or a button.

The acceleration input unit 721C is configured to receive input for acceleration of the vehicle from the user. The brake input unit 721B is configured to receive input for speed reduction of the vehicle from the user. Each of the acceleration input unit 721C and the brake input unit 721B may have a pedal form. In some embodiments, the acceleration input unit 721C or the brake input unit 721B may be configured as a touchscreen, a touch pad, or a button.

The camera 722 may include an image sensor and an image processing module. The camera 722 may process a still image or a moving image acquired by the image sensor (e.g., CMOS or CCD). In addition, the image processing module processes the still image or the moving image acquired through the image sensor, extracts necessary information, and delivers the extracted information to the controller 770. The vehicle may include the camera 722 for capturing the front image of the vehicle or the image of the vicinity of the vehicle and the monitoring unit 725 for capturing the image of the space inside the vehicle.

The monitoring unit 725 may acquire an image of a passenger. The monitoring unit 725 may acquire an image for biometric information of the passenger.

Although the monitoring unit 725 and the camera 722 are included in the input unit 720 in FIG. 26, the camera 722 may be included in the vehicle assistance apparatus 100 as described above.

The microphone 723 may process external sound signals into electrical data. The processed data may be utilized in various ways according to a function that the vehicle is performing. The microphone 723 may convert a user voice command into electrical data. The converted electrical data may be transmitted to the controller 770.

Meanwhile, in some embodiments, a camera 722 or the microphone 723 may not be included in the input unit 720 but may be included in the sensing unit 760.

The user input unit 724 is configured to receive information from the user. When information is input through the user input unit 724, the controller 770 may control the operation of the vehicle to correspond to the input information. The user input unit 724 may include a touch input unit or a mechanical input unit. In some embodiments, the user input unit 724 may be positioned in a region of the steering wheel. In this case, the driver may operate the user input unit 724 with the fingers while gripping the steering wheel.

The sensing unit 760 is configured to sense signals associated with, for example, signals related to driving of the vehicle. To this end, the sensing unit 760 may include a collision sensor, a wheel sensor, a speed sensor, tilt sensor, a weight sensor, a heading sensor, a yaw sensor, a gyro sensor, a position module, a vehicle forward/reverse sensor, a battery sensor, a fuel sensor, a tire sensor, a steering sensor based on rotation of the steering wheel, a vehicle interior temperature sensor, a vehicle interior humidity sensor, an ultrasonic sensor, a radar, a Lidar, etc.

As such, the sensing unit 760 may acquire sensing signals with regard to, for example, vehicle collision information, vehicle traveling direction information, vehicle location information (GPS information), vehicle angle information, vehicle speed information, vehicle acceleration information, vehicle tilt information, vehicle forward/reverse information, battery information, fuel information, tire information, vehicle lamp information, vehicle interior temperature information, vehicle interior humidity information, steering wheel rotation angle information, etc.

Meanwhile, the sensing unit 760 may further include, for example, an accelerator pedal sensor, a pressure sensor, an engine speed sensor, an Air Flow-rate Sensor (AFS), an Air Temperature Sensor (ATS), a Water Temperature Sensor (WTS), a Throttle Position Sensor (TPS), a Top Dead Center (TDC) sensor, and a Crank Angle Sensor (CAS).

The sensing unit 760 may include a biometric sensor. The biometric sensor senses and acquires biometric information of the passenger. The biometric information may include fingerprint information, iris-scan information, retina-scan information, hand geometry information, facial recognition information, and voice recognition information. The biometric sensor may include a sensor for sensing biometric information of the passenger. Here, the monitoring unit 725 and the microphone 723 may operate as a sensor. The biometric sensor may acquire hand geometry information and facial recognition information through the monitoring unit 725.

The output unit 740 is configured to output information processed by the controller 770. The output unit 740 may include a display unit 741, a sound output unit 742, and a haptic output unit 743.

The display unit 741 may display information processed by the controller 770. For example, the display unit 741 may display vehicle associated information. Here, the vehicle associated information may include vehicle control information for direct control of the vehicle or driver assistance information for aiding in driving of the vehicle. In addition, the vehicle associated information may include vehicle state information that indicates the current state of the vehicle or vehicle traveling information regarding traveling of the vehicle.

The display unit 741 may include at least one selected from among a Liquid Crystal Display (LCD), a Thin Film Transistor LCD (TFT LCD), an Organic Light Emitting Diode (OLED), a flexible display, a 3D display, and an e-ink display.

The display unit 741 may configure an inter-layer structure with a touch sensor, or may be integrally formed with the touch sensor to implement a touchscreen. The touchscreen may function as the user input unit 724 which provides an input interface between the vehicle and the user and also function to provide an output interface between the vehicle and the user. In this case, the display unit 741 may include a touch sensor which senses a touch to the display unit 741 so as to receive a control command in a touch manner. When a touch is input to the display unit 741 as described above, the touch sensor may sense the touch and the controller 770 may generate a control command corresponding to the touch. Content input in a touch manner may be characters or numbers, or may be, for example, instructions in various modes or menu items that may be designated.

Meanwhile, the display unit 741 may include a cluster to allow the driver to check vehicle state information or vehicle traveling information while driving the vehicle. The cluster may be positioned on a dashboard. In this case, the driver may check information displayed on the cluster while looking forward.

Meanwhile, in some embodiments, the display unit 741 may be implemented as a head up display (HUD). When the display unit 741 is implemented as a HUD, information may be output through a transparent display provided at the windshield. Alternatively, the display unit 741 may include a projector module to output information through an image projected onto the windshield.

The sound output unit 742 is configured to convert electrical signals from the controller 170 into audio signals and to output the audio signals. To this end, the sound output unit 742 may include, for example, a speaker. The sound output unit 742 may output sound corresponding to the operation of the user input unit 724.

The haptic output unit 743 is configured to generate tactile output. For example, the haptic output unit 743 may operate to vibrate a steering wheel, a safety belt, or a seat so as to allow the user to recognize an output thereof.

The vehicle drive unit 750 may control the operation of various devices of the vehicle. The vehicle drive unit 750 may include at least one of a power source drive unit 751, a steering drive unit 752, a brake drive unit 753, a lamp drive unit 754, an air conditioner drive unit 755, a window drive unit 756, an airbag drive unit 757, a sunroof drive unit 758, and a suspension drive unit 759.

The power source drive unit 751 may perform electronic control of a power source inside the vehicle.

For example, in the case where a fossil fuel based engine (not illustrated) is a power source, the power source drive unit 751 may perform electronic control of the engine. As such, the power source drive unit 751 may control, for example, an output torque of the engine. In the case where the power source drive unit 751 is an engine, the power source drive unit 751 may control the speed of the vehicle by controlling the output torque of the engine under the control of the controller 770.

In another example, in the case where an electric motor (not illustrated) is a power source, the power source drive unit 751 may perform control of the motor. As such, the power source drive unit 751 may control, for example, the RPM and torque of the motor.

The steering drive unit 752 may perform electronic control of a steering apparatus inside the vehicle. The steering drive unit 752 may change the direction of travel of the vehicle.

The brake drive unit 753 may perform electronic control of a brake apparatus (not illustrated) inside the vehicle. For example, the brake drive unit 753 may reduce the speed of the vehicle by controlling the operation of brakes positioned at wheels. In another example, the brake drive unit 753 may adjust the direction of travel of the vehicle leftward or rightward by differentiating the operation of respective brakes positioned at left and right wheels.

The lamp drive unit 754 may turn at least one lamp arranged inside and outside the vehicle on or off. In addition, the lamp drive unit 754 may control, for example, the intensity and direction of light of each lamp. For example, the lamp drive unit 754 may perform control of a turn signal lamp or a brake lamp.

The air conditioner drive unit 755 may perform electronic control of an air conditioner (not illustrated) inside the vehicle. For example, when the interior temperature of the vehicle is high, the air conditioner drive unit 755 may operate the air conditioner to supply cold air to the interior of the vehicle.

The window drive unit 756 may perform electronic control of a window apparatus inside the vehicle. For example, the window drive unit 756 may control opening or closing of left and right windows of the vehicle.

The airbag drive unit 757 may perform the electronic control of an airbag apparatus inside the vehicle. For example, the airbag drive unit 757 may control an airbag to be deployed in a dangerous situation.

The sunroof drive unit 758 may perform electronic control of a sunroof apparatus (not illustrated) inside the vehicle. For example, the sunroof drive unit 758 may control opening or closing of a sunroof.

The suspension drive unit 759 may perform electronic control of a suspension apparatus (not shown) inside the vehicle. For example, when a road surface is uneven, the suspension drive unit 759 may control the suspension apparatus to reduce vibrations of the vehicle.

The memory 730 is electrically connected to the controller 770. The memory 730 may store basic data of the unit, control data for operation control of the unit and input/output data. The memory 730 may be various storage apparatuses, which are implemented in a hardware manner, such as a ROM, RAM, EPROM, flash drive and hard drive. The memory 730 may store a variety of data for overall operation of the vehicle, such as a program for processing or control of the controller 770.

The interface 780 may serve as a passage for various kinds of external devices that are connected to the vehicle. For example, the interface 780 may have a port that is connectable to the mobile terminal 600 and may be connected to the mobile terminal 600 through the port. In this case, the interface 780 may exchange data with the mobile terminal 600.

The interface 780 may serve as a passage for providing electric energy to the connected mobile terminal 600. When the mobile terminal 600 is electrically connected to the interface 780, the interface 780 may provide electric energy supplied from the power supply 790 to the mobile terminal 600 under control of the controller 770.

The controller 770 may control the overall operation of each unit inside the vehicle. The controller 770 may be referred to as an Electronic Controller (ECU).

The controller 770 may perform a function corresponding to the delivered signal according to delivery of a signal for performing the vehicle assistance apparatus 100.

The controller 770 may be implemented in a hardware manner using at least one selected from among Application Specific Integrated Circuits (ASICs), Digital Signal Processors (DSPs), Digital Signal Processing Devices (DSPDs), Programmable Logic Devices (PLDs), Field Programmable Gate Arrays (FPGAs), processors, controllers, microcontrollers, microprocessors, and electric units for the implementation of other functions.

The controller 770 may perform the role of the above-described processor 170. That is, the processor 170 of the vehicle assistance apparatus 100 may be directly set in the controller 770 of the vehicle. In such an embodiment, the vehicle assistance apparatus 100 may be understood as a combination of some components of the vehicle.

Alternatively, the controller 770 may control the components to transmit information requested by the processor 170.

The power supply 790 may supply power required to operate the respective components under the control of the controller 770. In particular, the power supply 790 may receive power from, for example, a battery (not illustrated) inside the vehicle.

The AVN apparatus 400 may exchange data with the controller 770. The controller 770 may receive navigation information from the AVN apparatus or a separate navigation apparatus. Here, the navigation information may include destination information, information on a route to the destination, map information related to vehicle traveling and current position information of the vehicle.

The above described features, configurations, effects, and the like are included in at least one of the embodiments of the present invention, and should not be restricted to only one embodiment. In addition, the features, configurations, effects, and the like as illustrated in each embodiment may be implemented with regard to other embodiments as they are combined with one another or modified by those skilled in the art. Thus, content related to these combinations and modifications should be construed as including in the scope and spirit of the invention as disclosed in the accompanying claims.

Further, although the embodiments have been mainly described until now, they are just exemplary and do not restrict the present invention. Thus, those skilled in the art to which the present invention pertains will know that various modifications and applications which have not been exemplified may be carried out within a range which does not deviate from the essential characteristics of the embodiments. For instance, the constituent elements described in detail in the exemplary embodiments can be modified to be carried out. Further, the differences related to such modifications and applications shall be construed to be included in the scope of the present invention specified in the attached claims.

INDUSTRIAL APPLICABILITY

The vehicle assistance apparatus according to the embodiment can restrict the request for the remote start for each situation, thereby enabling the driver's convenience.

The invention claimed is:

1. A vehicle assistance apparatus comprising:
a communication unit for receiving a remote start request;
a sensor unit for sensing an object around a vehicle; and
a processor for detecting a remote start restriction element among the objects around the vehicle, setting a restriction level with respect to the remote start restriction element, determining a level of the detected remote start restriction element, and controlling a remote start according to the remote start request to be restricted and performed according to the determined level,
wherein the restriction level comprises at least one of:
a first restriction level at which the vehicle is positioned in a remote start unavailable area by regulation,
a second restriction level at which the exhaust gas emission of the vehicle is harmful, or
a third restriction level at which a person other than the driver is positioned within a predetermined distance of the vehicle, and
wherein the processor is configured to:
based on setting the restriction level to the second restriction level, determine a power source of the vehicle, and activate a start of the vehicle according to the determined power source of the vehicle,
based on determining that the vehicle corresponds to a hybrid vehicle, activate the start of the vehicle using electric power, and
based on determining that the vehicle corresponds to an internal combustion engine vehicle or an external combustion engine vehicle, activate the start of the vehicle at an RPM that is lower than a preset RPM.

2. The vehicle assistance apparatus according to claim 1, wherein the processor maintains a start off state and transmits a remote start unavailable situation to a user through the communication unit when determining the detected remote start restriction element as the first restriction level.

3. The vehicle assistance apparatus according to claim 1, the remote start restriction element which is determined as the second restriction level is at least one of:
a case where a flower bed is detected on the exhaust unit side, or
a case where the vehicle is disposed in an indoor space.

4. The vehicle assistance apparatus according to claim 1, wherein the processor maintains a start off state when the detected remote start restriction element is determined to be the second restriction level and turns on the start when the position of the user enters a predetermined distance of the vehicle.

5. The vehicle assistance apparatus according to claim 1, wherein the processor turns on the start and controls the exhaust gas emission of the exhaust unit when the processor determines the detected remote start restriction element as the second restriction level.

6. The vehicle assistance apparatus according to claim 5, wherein the control of the exhaust gas emission of the exhaust unit includes:
a direction control for changing the exhaust gas emission direction, or
a time control for changing the exhaust gas emission time.

7. The vehicle assistance apparatus according to claim 1, wherein the processor controls to turn on the start and to block the entry of the outside air of the vehicle when determining the detected remote start restriction element as the second restriction level.

8. The vehicle assistance apparatus according to claim 7, wherein the processor detects whether or not a window of the vehicle is open, and controls the window to be closed when the window is open.

9. The vehicle assistance apparatus according to claim 1, wherein the processor turns on the start after detecting that the person is out of the predetermined distance of the vehicle in a start off state when determining the detected remote start restriction element as the third restriction level.

10. The vehicle assistance apparatus according to claim 1, wherein the processor turns off the start while the person is detected within a predetermined distance of the vehicle in a start on state when determining the detected remote start restriction element as the third restriction level.

11. The vehicle assistance apparatus according to claim 1, wherein the processor controls the exhaust gas emission of the exhaust unit in a start on state when determining the detected remote start restriction element as the third restriction level.

12. The vehicle assistance apparatus according to claim 1, wherein the processor turns on at a predetermined rpm or less when determining the detected remote start restriction element as the third restriction level.

13. The vehicle assistance apparatus according to claim 1, wherein the processor detects an idling restriction time by the regulation when determining the detected remote start restriction element as the first restriction level.

14. The vehicle assistance apparatus according to claim 1, wherein the processor transmits the remote start restriction information to the user's terminal through the communication unit.

15. The vehicle assistance apparatus according to claim 14, wherein the processor transmits the remote start restriction information to the terminal when the remote start restriction element is detected after the vehicle is parked.

16. The vehicle assistance apparatus according to claim 1, wherein the processor turns off the start and performs a restriction function in a start off state when the remote start restriction element is detected.

17. The vehicle assistance apparatus according to claim 16, wherein the processor turns on a hot wire in the start off state when the user requests heating.

18. The vehicle assistance apparatus according to claim 16, wherein the processor opens the window of the vehicle in the start off state when a user requests cooling.

19. The vehicle assistance apparatus according to claim 16, wherein the processor detects a frost on a window of the vehicle and turns on a defrost function in the start off state.

20. A vehicle comprising:
the vehicle assistance apparatus according to claim 1.

* * * * *